US009763232B2

(12) United States Patent
Kim et al.

(10) Patent No.: US 9,763,232 B2
(45) Date of Patent: Sep. 12, 2017

(54) METHOD FOR FEEDING BACK CHANNEL STATUS INFORMATION IN WIRELESS COMMUNICATION SYSTEM SUPPORTING MULTIPLE ANTENNAS, AND APPARATUS THEREFOR

(71) Applicant: LG ELECTRONICS INC., Seoul (KR)

(72) Inventors: Youngtae Kim, Anyang-si (KR); Jonghyun Park, Anyang-si (KR); Kijun Kim, Anyang-si (KR); Hyungtae Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 14/443,321

(22) PCT Filed: Dec. 4, 2013

(86) PCT No.: PCT/KR2013/011148
§ 371 (c)(1),
(2) Date: May 15, 2015

(87) PCT Pub. No.: WO2014/088307
PCT Pub. Date: Jun. 12, 2014

(65) Prior Publication Data
US 2015/0327246 A1    Nov. 12, 2015

Related U.S. Application Data

(60) Provisional application No. 61/735,048, filed on Dec. 9, 2012.

(51) Int. Cl.
*H04W 72/04* (2009.01)
*H04B 7/06* (2006.01)
(Continued)

(52) U.S. Cl.
CPC ...... *H04W 72/0413* (2013.01); *H04B 7/0417* (2013.01); *H04B 7/0626* (2013.01);
(Continued)

(58) Field of Classification Search
None
See application file for complete search history.

(56) References Cited

U.S. PATENT DOCUMENTS 9,025,620 B2 *   5/2015   Lee .................. H04L 1/0041
                                            370/203
2008/0219370 A1   9/2008   Onggosanusi et al.
(Continued)

FOREIGN PATENT DOCUMENTS

KR    10-2011-0069741    6/2011
KR    10-2012-0025594    3/2012
(Continued)

OTHER PUBLICATIONS

PCT International Application No. PCT/KR2013/011148, Written Opinion of the International Searching Authority dated Mar. 20, 2014, 19 pages.
(Continued)

*Primary Examiner* — Hassan Kizou
*Assistant Examiner* — Deepa Belur
(74) *Attorney, Agent, or Firm* — Lee Hong Degerman Kang Waimey

(57) ABSTRACT

The present invention relates to a method for feeding back, by a terminal, channel status information (CSI) in a wireless communication system. In detail, the method includes the steps of feeding back a subband channel quality indication (CQI) and a subband precoding matrix index (PMI), wherein a first subband size for the subband CQI and a second subband size for the subband PMI are set differently.

7 Claims, 14 Drawing Sheets

(51) Int. Cl.
*H04B 7/0417* (2017.01)
*H04L 5/00* (2006.01)
*H04L 25/03* (2006.01)
*H04L 1/00* (2006.01)

(52) U.S. Cl.
CPC ......... *H04B 7/0632* (2013.01); *H04B 7/0639* (2013.01); *H04L 1/0031* (2013.01); *H04L 5/0023* (2013.01); *H04L 5/0057* (2013.01); *H04L 1/0026* (2013.01); *H04L 25/03898* (2013.01)

(56) References Cited

U.S. PATENT DOCUMENTS

| | | | | |
|---|---|---|---|---|
| 2010/0091905 | A1* | 4/2010 | Khan | H04L 5/0023 375/296 |
| 2010/0098012 | A1* | 4/2010 | Bala | H04L 5/001 370/329 |
| 2010/0113078 | A1* | 5/2010 | Farajidana | H04B 7/024 455/507 |
| 2010/0183086 | A1* | 7/2010 | Ko | H04B 7/0413 375/260 |
| 2010/0311430 | A1* | 12/2010 | Katayama | H04L 1/0027 455/450 |
| 2010/0322176 | A1* | 12/2010 | Chen | H04B 7/024 370/329 |
| 2011/0170498 | A1 | 7/2011 | Liu et al. | |
| 2012/0063500 | A1* | 3/2012 | Wang | H04L 1/0026 375/224 |
| 2013/0039349 | A1* | 2/2013 | Ebrahimi Tazeh Mahalleh | H04L 1/0013 370/336 |
| 2013/0083681 | A1* | 4/2013 | Ebrahimi Tazeh Mahalleh | H04L 5/0057 370/252 |
| 2014/0355703 | A1* | 12/2014 | Schober | H04B 7/0486 375/267 |
| 2015/0016288 | A1* | 1/2015 | Maattanen | H04B 7/066 370/252 |
| 2016/0020837 | A1* | 1/2016 | Schober | H04B 7/0469 375/267 |

FOREIGN PATENT DOCUMENTS

| | | |
|---|---|---|
| KR | 20120029338 | 3/2012 |
| KR | 10-2012-0031893 | 4/2012 |
| WO | 2010/107129 | 9/2010 |

OTHER PUBLICATIONS

European Search Report issued in Application No. 13860919.3, Jun. 14, 2016, 9 pages.
LG Electronics, "Frequency granularity of CQI and PMI Feedback," 3GPP TSG RAN WGI #50, R1-073491, Athens, Greece, Aug. 20-24, 2007, 4 pages.
Huawei, HiSilicon, "Discussion on CSI reporting modes on PUSCH," 3GPP TSG RAN WGI Meeting #63, R1-106156, Jacksonville, USA, Nov. 15-19, 2010, 6 pages.
PCT International Application No. PCT/KR2013/011148, Written Opinion of the International Searching Authority dated Mar. 20, 2014, 15 pages.

* cited by examiner

FIG. 2
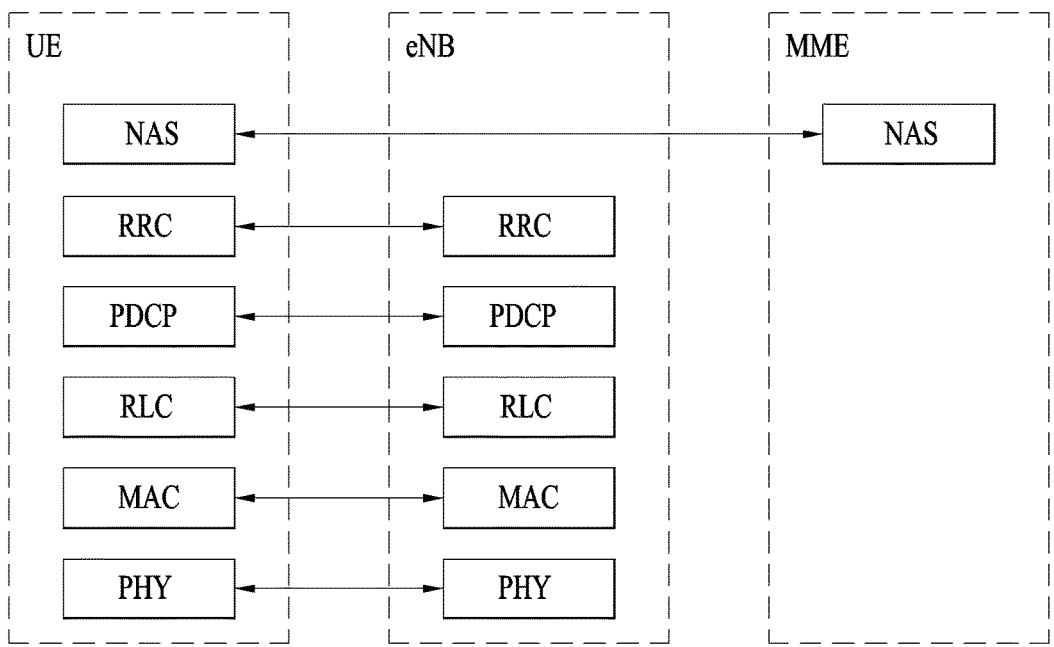
(a) control-plane protocol stack
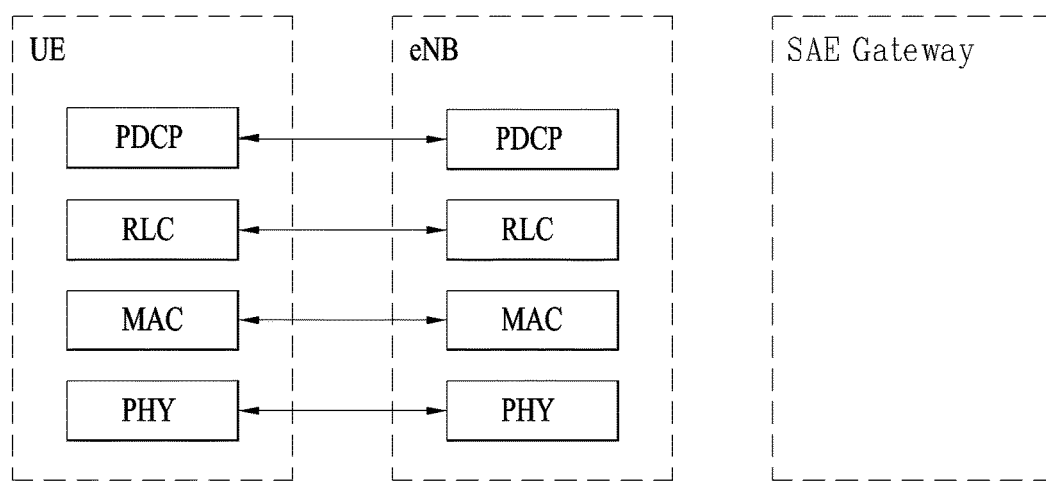
(b) user-plane protocol stack

| CQI reporting mode | | PMI feedback type | |
|---|---|---|---|
| | | no PMI | single PMI, |
| PUCCH CQI feedback type | wideband (wideband CQI) | mode 1-0 | mode 1-1 |
| | UE-selected (subband CQI) | mode 2-0 | mode 2-1 |

FIG. 14
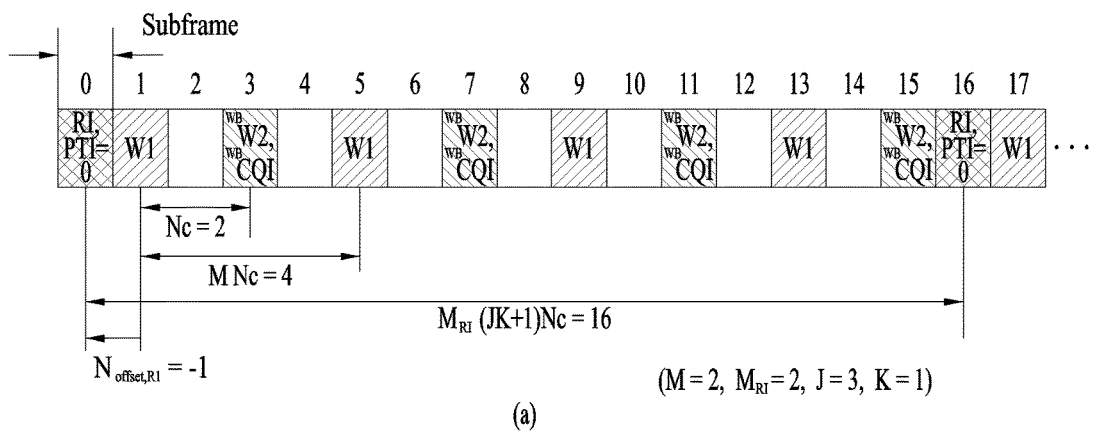
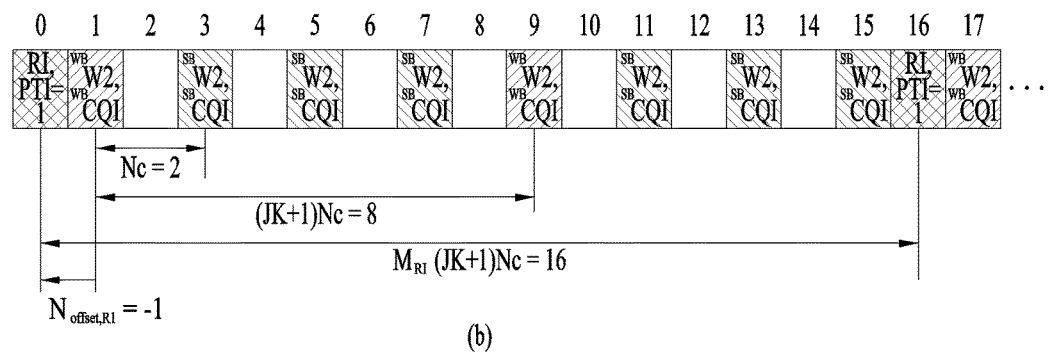
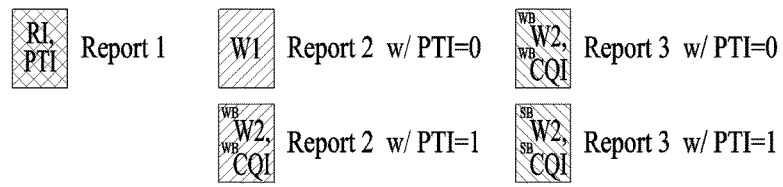

FIG. 15

|  | 20 RB(s) | | 50 RB(s) | | 100 RB(s) | |
| --- | --- | --- | --- | --- | --- | --- |
|  | AP4 | AP8 | AP4 | AP8 | AP4 | AP8 |
| Mode 1-2 | 26 bit(s) | 31 bit(s) | 42 bit(s) | 47 bit(s) | 58 bit(s) | 63 bit(s) |
| Mode 3-1 | 20 bit(s) | 25 bit(s) | 28 bit(s) | 33 bit(s) | 36 bit(s) | 41 bit(s) |
| Mode 2-2 | 23 bit(s) | 28 bit(s) | 29 bit(s) | 34 bit(s) | 34 bit(s) | 39 bit(s) |
| Mode (1,0.5) | 56 bit(s) | 61 bit(s) | 92 bit(s) | 97 bit(s) | 132 bit(s) | 137 bit(s) |
| Mode (1,1) | 36 bit(s) | 41 bit(s) | 60 bit(s) | 65 bit(s) | 84 bit(s) | 89 bit(s) |
| Mode (1,1.5) | 32 bit(s) | 37 bit(s) | 48 bit(s) | 53 bit(s) | 68 bit(s) | 73 bit(s) |
| Mode (1,2) | 28 bit(s) | 33 bit(s) | 44 bit(s) | 49 bit(s) | 60 bit(s) | 65 bit(s) |
| Mode (1,2.5) | 24 bit(s) | 29 bit(s) | 40 bit(s) | 45 bit(s) | 52 bit(s) | 57 bit(s) |
| Mode (1,3) | 24 bit(s) | 29 bit(s) | 36 bit(s) | 41 bit(s) | 52 bit(s) | 57 bit(s) |
| Mode (0.5,0.5) | 66 bit(s) | 71 bit(s) | 108 bit(s) | 113 bit(s) | 156 bit(s) | 161 bit(s) |
| Mode (1.5,1.5) | 30 bit(s) | 35 bit(s) | 42 bit(s) | 47 bit(s) | 60 bit(s) | 65 bit(s) |
| Mode (2,2) | 24 bit(s) | 29 bit(s) | 36 bit(s) | 41 bit(s) | 48 bit(s) | 53 bit(s) |
| Mode (2.5,2.5) | 18 bit(s) | 23 bit(s) | 30 bit(s) | 35 bit(s) | 36 bit(s) | 41 bit(s) |
| Mode (3,3) | 18 bit(s) | 23 bit(s) | 24 bit(s) | 29 bit(s) | 36 bit(s) | 41 bit(s) |

FIG. 16

|  | 20 RB(s) | | 50 RB(s) | | 100 RB(s) | |
| --- | --- | --- | --- | --- | --- | --- |
|  | AP4 | AP8 | AP4 | AP8 | AP4 | AP8 |
| Mode 1-2 | 30 bit(s) | 35 bit(s) | 46 bit(s) | 51 bit(s) | 62 bit(s) | 67 bit(s) |
| Mode 3-1 | 34 bit(s) | 39 bit(s) | 50 bit(s) | 55 bit(s) | 66 bit(s) | 71 bit(s) |
| Mode 2-2 | 29 bit(s) | 34 bit(s) | 35 bit(s) | 40 bit(s) | 40 bit(s) | 45 bit(s) |
| Mode (1,0.5) | 70 bit(s) | 75 bit(s) | 114 bit(s) | 119 bit(s) | 162 bit(s) | 167 bit(s) |
| Mode (1,1) | 50 bit(s) | 55 bit(s) | 82 bit(s) | 87 bit(s) | 114 bit(s) | 119 bit(s) |
| Mode (1,1.5) | 46 bit(s) | 51 bit(s) | 70 bit(s) | 75 bit(s) | 98 bit(s) | 103 bit(s) |
| Mode (1,2) | 42 bit(s) | 47 bit(s) | 66 bit(s) | 71 bit(s) | 90 bit(s) | 95 bit(s) |
| Mode (1,2.5) | 38 bit(s) | 43 bit(s) | 62 bit(s) | 67 bit(s) | 82 bit(s) | 87 bit(s) |
| Mode (1,3) | 38 bit(s) | 43 bit(s) | 58 bit(s) | 63 bit(s) | 82 bit(s) | 87 bit(s) |
| Mode (0.5,0.5) | 90 bit(s) | 95 bit(s) | 146 bit(s) | 151 bit(s) | 210 bit(s) | 215 bit(s) |
| Mode (1.5,1.5) | 42 bit(s) | 47 bit(s) | 58 bit(s) | 63 bit(s) | 82 bit(s) | 87 bit(s) |
| Mode (2,2) | 34 bit(s) | 39 bit(s) | 50 bit(s) | 55 bit(s) | 66 bit(s) | 71 bit(s) |
| Mode (2.5,2.5) | 26 bit(s) | 31 bit(s) | 42 bit(s) | 47 bit(s) | 50 bit(s) | 55 bit(s) |
| Mode (3,3) | 26 bit(s) | 31 bit(s) | 34 bit(s) | 39 bit(s) | 50 bit(s) | 55 bit(s) |

METHOD FOR FEEDING BACK CHANNEL STATUS INFORMATION IN WIRELESS COMMUNICATION SYSTEM SUPPORTING MULTIPLE ANTENNAS, AND APPARATUS THEREFOR

CROSS-REFERENCE TO RELATED APPLICATIONS

This application is the National Stage filing under 35 U.S.C. 371 of International Application No. PCT/KR2013/011148, filed on Dec. 4, 2013, which claims the benefit of U.S. Provisional Application No. 61/735,048, filed on Dec. 9, 2012, the contents of which are all hereby incorporated by reference herein in their entirety.

TECHNICAL FIELD

The present invention relates to a wireless communication system, and more particularly, to a method of feeding back channel sate information in a wireless communication system supporting multiple antennas and an apparatus therefor.

BACKGROUND ART

As an example of a mobile communication system to which the present invention is applicable, a 3rd generation partnership project long term evolution (3GPP LTE) (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in the 3GPP. E-UMTS may be referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink (DL) or uplink (UL) transmission service to multiple UEs. Different cells may be configured to provide different bandwidths. The eNB controls data transmission and reception to and from a plurality of UEs. Regarding DL data, the eNB transmits DL scheduling information to notify a corresponding UE of a time/frequency domain within which data is to be transmitted, coding, data size, and hybrid automatic repeat and request (HARQ)-related information. In addition, regarding UL data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of the UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simplified structure, open interface, appropriate power consumption of a UE, etc. are required.

In order to assist efficient management of a wireless communication system of a base station, a user equipment periodically and/or aperiodically reports current channel state information to the base station. Since the reported channel state information may include results which are calculated in consideration of various situations, it is required to have a more efficient reporting method.

DISCLOSURE OF THE INVENTION

Technical Task

In the following, the present invention intends to propose a method of reporting channel state information in a wireless communication system supporting multiple antennas and an apparatus therefor based on the aforementioned discussion.

Technical tasks obtainable from the present invention are non-limited the above-mentioned technical task. And, other unmentioned technical tasks can be clearly understood from the following description by those having ordinary skill in the technical field to which the present invention pertains.

TECHNICAL SOLUTION

To achieve these and other advantages and in accordance with the purpose of the present invention, as embodied and broadly described, according to one embodiment, a method of performing feedback on channel status information (CSI), which is performed by a user equipment in a wireless communication system, includes the step of performing feedback on a subband CQI (channel quality indication) and a subband PMI (precoding matrix index). In this case, a first subband size of the subband CQI and a second subband size of the subband PMI can be differently configured.

Preferably, the feedback may correspond to an aperiodic feedback performed on a PUSCH (physical uplink shared channel).

Preferably, at least one of the first subband size and the second subband size can be configured to correspond to a prescribed multiple of a predetermined subband size. More preferably, the prescribed multiple can be determined according to a system bandwidth.

Preferably, the second subband size can be configured by a prescribed multiple of the first subband size.

Preferably, the method can further include the step of determining at least one of the first subband size and the second subband size based on a subband size according to a system bandwidth and a parameter for configuring a subband size.

Preferably, the first subband size can be determined according to the number of subbands permitted for the subband CQI and the second subband size can be determined according to the number of subbands permitted for the subband PMI.

Preferably, the method can further include the step of receiving a channel status information request (CSI request) from a base station. In this case, at least one of the first subband size and the second subband size can be differently determined according to a field value of the CSI request.

To further achieve these and other advantages and in accordance with the purpose of the present invention, according to a different embodiment, a user equipment performing feedback on channel status information (CSI) in a wireless communication system includes an RF (radio frequency) unit and a processor, the processor configured to perform feedback on a subband CQI (channel quality indication) and a subband PMI (precoding matrix index). In this case, a first subband size of the subband CQI and a second subband size of the subband PMI can be differently configured.

ADVANTAGEOUS EFFECTS

According to embodiment of the present invention, it is able to more efficiently report channel state information in a wireless communication system supporting multiple antennas.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for structures of control and user planes of radio interface protocol between a 3GPP radio access network standard-based user equipment and E-UTRAN;

FIG. 14 is a diagram for an example of a process of periodically reporting channel state information in case of using a hierarchical codebook;

FIGS. 15 and 16 are diagrams for explaining an aperiodic feedback mode of LTE-A and a feedback overhead for subband CQI/PMI proposed by the present invention;

BEST MODE

Mode for Invention

Figure 1:
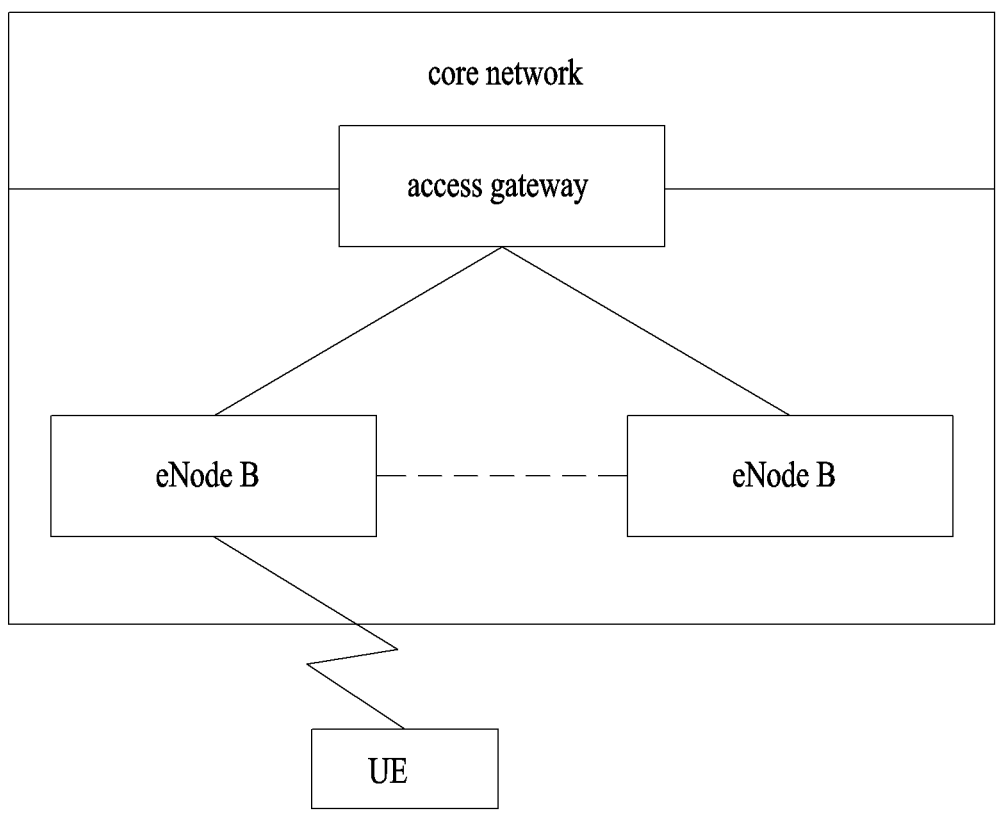
FIG. 1 is a schematic diagram of E-UMTS network structure as one example of a wireless communication system.

In the following, composition, action and other characteristics of the present invention can be easily understood by embodiments of the present invention explained with reference to the attached drawings. The embodiments explained in the following correspond to examples of the technical characteristics of the present invention applied to 3GPP system.

Although the embodiments of the present invention are explained with an example of LTE system and LTE-A system, this is an example only. The embodiments of the present invention can be applied to any communication system corresponding to the aforementioned definition. In the present specification, although the embodiments of the present invention are explained on the basis of a FDD scheme, this is an example only. The embodiments of the present invention can also be applied to an H-FDD scheme or a TDD scheme in a manner of being easily modified.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer, which is a first layer, provides an information transfer service to an upper layer using a physical channel. The physical layer is connected to a media access control (MAC) layer of an upper layer via a transmission channel (an antenna port channel). Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an OFDMA scheme in DL and is modulated using an SC-FDMA scheme in UL.

The MAC layer, which is a second layer, provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting an eNB is configured to use one of bandwidths of 1.4, 3, 5, 10, and 20 MHz to provide a DL or UL transmission service to a plurality of UEs. Different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
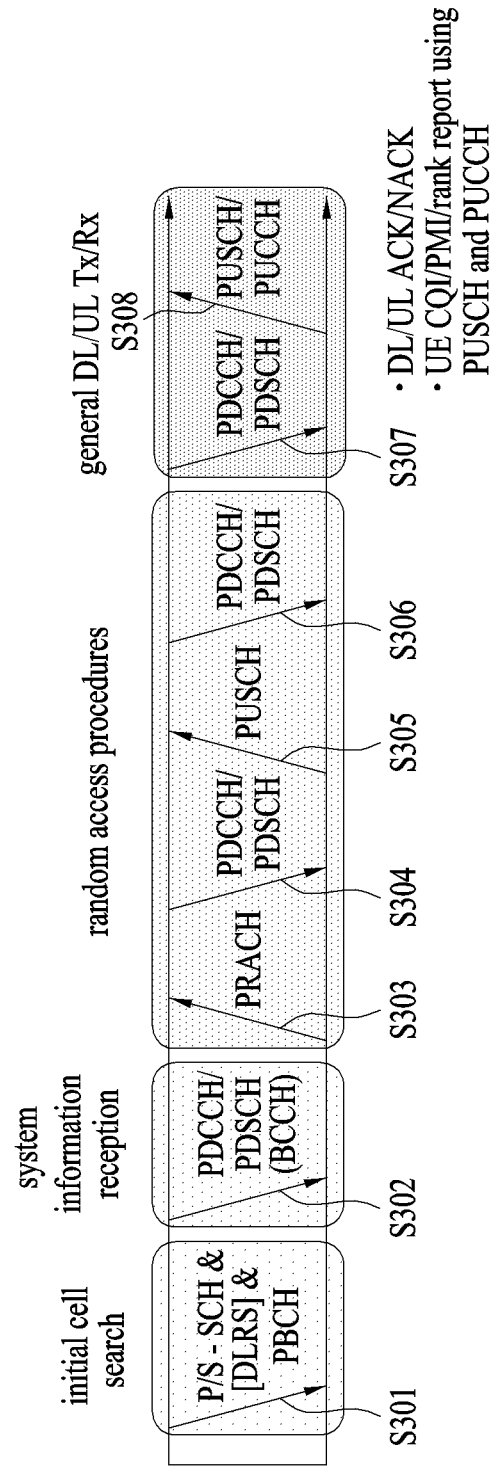
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

The user equipment performs initial cell search such as synchronizing with the base station when it newly enters a cell or the power is turned on at step [S301]. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at the step [S302].

Afterwards, the user equipment may perform a random access procedure (RACH) such as steps [S303] to [S306] to complete access to the base station. To this end, the user equipment may transmit a preamble through a physical random access channel (PRACH) [S303], and may receive a response message to the preamble through the PDCCH and the PDSCH corresponding to the PDCCH [S304]. In case of a contention based RACH, the user equipment may perform a contention resolution procedure such as transmission [S305] of additional physical random access channel and reception [S306] of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) [S307] and transmit a physical uplink shared channel (PUSCH) and a physical uplink control channel (PUCCH) [S308], as a general procedure of transmitting uplink/downlink signals. In particular, the user equipment receives downlink control information (DCI) through PDCCH. In this case, the DCI includes control information such as resource allocation information on the user equipment and a format of the DCI varies according to a usage of the DCI.

Meanwhile, control information transmitted to the base station in UL or control information received from the base station includes DL/UL CK/NACK signal, CQI (channel quality indicator), PMI (precoding matrix index), RI (rank indicator) and the like. In case of 3GPP LTE system, the user equipment can transmit the aforementioned control information such as CQI/PMI/RI etc. through PUSCH and/or PUCCH.

Figure 4:
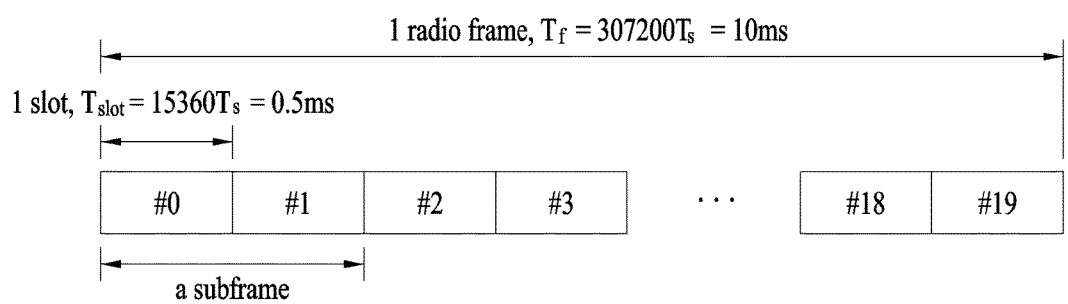
FIG. 4 is a diagram for a structure of a radio frame in LTE system.

FIG. 4 is a diagram for a structure of a radio frame in LTE system.

Referring to FIG. 4, one radio frame has a length of 10 ms $(327,200 \times T_S)$ and is constructed with 10 subframes in equal size. Each of the subframes has a length of 1 ms and is constructed with two slots. Each of the slots has a length of 0.5 ms $(15,360 \times T_S)$. In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
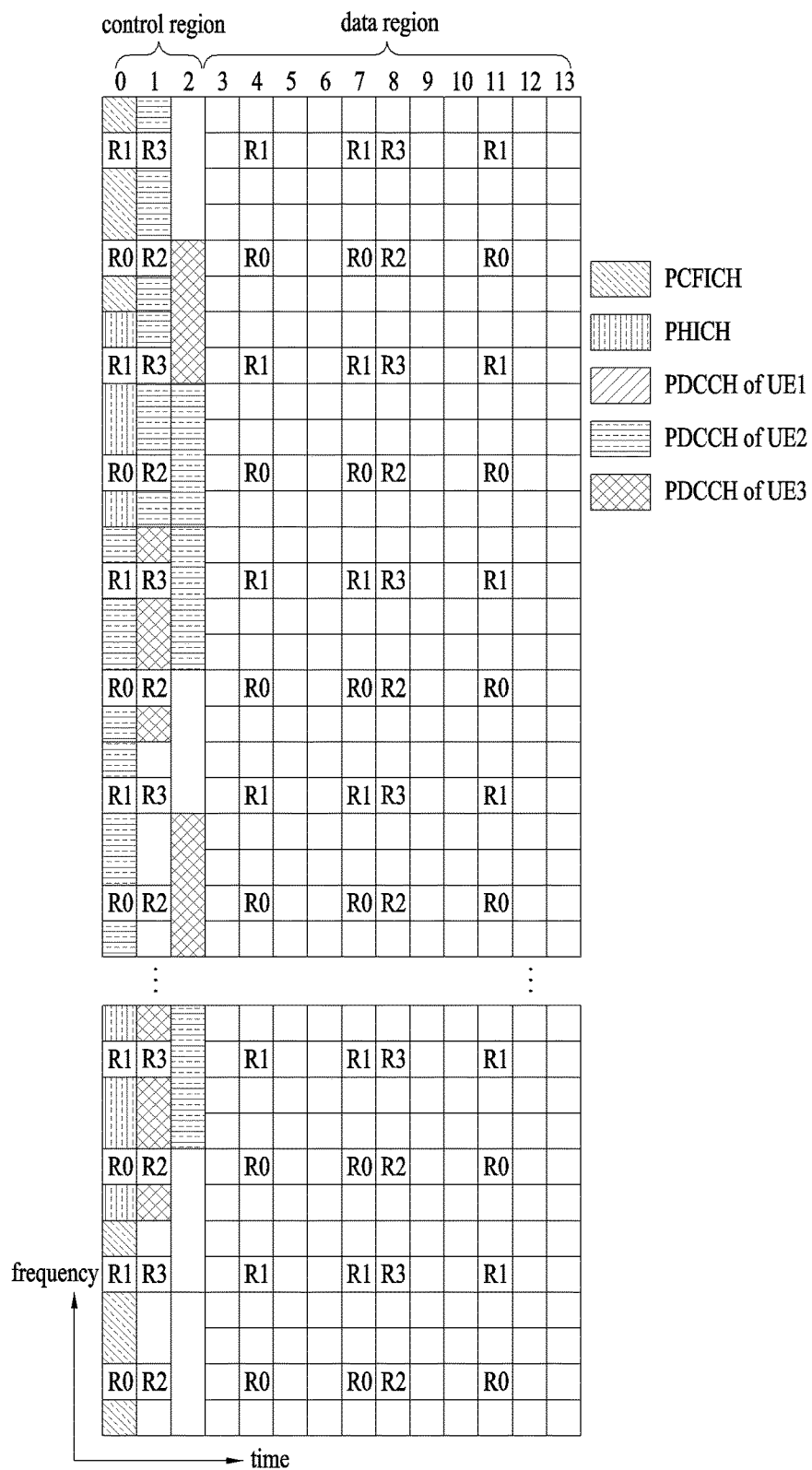
FIG. 5 is a diagram for an example of a structure of a downlink subframe.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the drawing, R1 to R4 may indicate a reference signal (hereinafter abbreviated RS) or a pilot signal for antennas 0 to 3. The RS is fixed as a constant pattern in the subframe irrespective of the control region and the data region. The control channel is assigned to a resource to which the RS is not assigned thereto among the control region and a traffic channel is also assigned to a resource to which the RS is not assigned thereto among the data region. The control channel assigned to the control region may include a physical control format indicator channel (PCFICH), a physical hybrid-ARQ indicator channel (PHICH), a physical downlink control channel (PDCCH) and the like.

The physical control format indicator channel (PCFICH) informs a user equipment of the number of OFDM symbols used for the PDCCH in every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated by a QPSK (quadrature phase shift keying).

The physical hybrid-ARQ indicator channel (PHICH) is used for carrying HARQ ACK/NACK for an UL transmission. In particular, the PHICH indicates a channel on which DL ACK/NACK information for UL HARQ is transmitted. The PHICH consists of a single REG and is scrambled cell-specifically. The ACK/NACK is indicated with 1 bit and is modulated by BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The physical downlink control channel (PDCCH) is assigned to the first n OFDM symbol of a subframe. In this case, the n is an integer equal to or greater than 1 and is indicated by the PCFICH. The PDCCH consists of at least one CCE. The PDCCH informs each user equipment or a user equipment group of information on resource allocation of a PCH (paging channel) and a DL-SCH (downlink-shared channel), which correspond to transport channels, an uplink scheduling grant, HARQ information and the like. The PCH (paging channel) and the DL-SCH (downlink-shared channel) are transmitted on the PDSCH. Hence, a base station and a user equipment transmit and receive data on the PDSCH in general except a specific control information or a specific service data.

Information for indicating prescribed user equipment (one or a plurality of user equipments) configured to receive data of the PDSCH, information for indicating a method of receiving/decoding the PDSCH data, and the like are transmitted in a manner of being included in the PDCCH. For instance, assume that a specific PDCCH is CRC masked with an RNTI (radio network temporary identity) called "A" and information on data transmitted using a radio resource (e.g., frequency position) called "B" and a transmission form information (e.g., a transport block size, a modulation scheme, coding information, and the like) called "C" is transmitted in a specific subframe. In this case, the user equipment within a cell monitors the PDCCH using the RNTI information of the user equipment. If there exist at least one or more user equipments having the "A" RNTI, the user equipments receive the PDCCH. And, the user equipments receive the PDSCH, which is indicated by the "B" and the "C", via the received information of the PDCCH.

Figure 6:
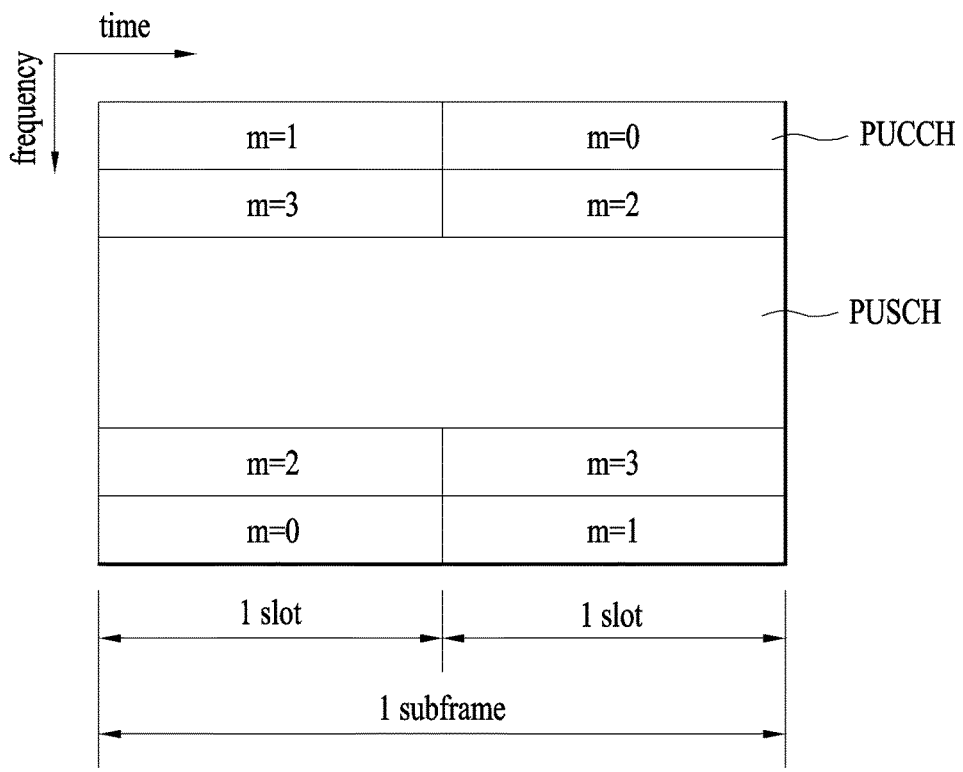
FIG. 6 is a diagram for an example of a structure of an uplink subframe in LTE.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks allocated to the PUCCH are frequency hopped on a slot boundary. In particular, FIG. 6 shows an example that the PUCCHs satisfying conditions (e.g., m=0, 1, 2, 3) are assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi-antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
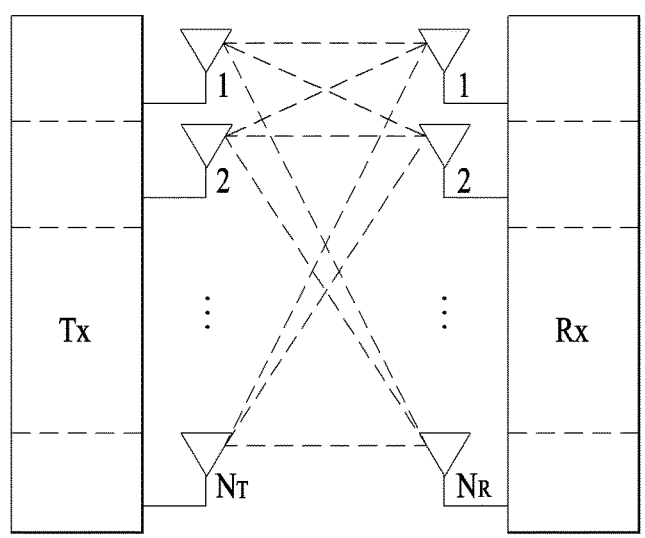
FIG. 7 is a diagram for an example of a configuration of a general MIMO communication system.

A block diagram of a general multi-antenna communication system is depicted in FIG. 7. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1. In this case, the $R_i$ is a smaller value among the $N_T$ and the $N_R$.

$$R_i = \min(N_T, N_R) \qquad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a 3rd generation mobile communication, a next generation wireless LAN and the like.

If we look at the research trend related to the multi-antenna so far, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist NT number of transmitting antenna and NR number of receiving antenna.

First of all, if we look into a transmission signal, since the maximum number of information capable of being transmitted is NT in case that there exists NT number of transmitting antenna, transmission information can be represented as a vector in the following Formula 2.

$$s = [s_1, s_2, \ldots, s_{N_T}]^T \quad \text{[Formula 2]}$$

Meanwhile, for each of the transmission information $s_1, s_2, \ldots, s_{N_T}$, a transmit power may be differentiated according to the each of the transmission information. In this case, if each of the transmit powers is represented as $P_1, P_2, \ldots, P_{N_T}$, transmit power-adjusted transmission information can be represented as a vector in the following Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Fromula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vectors $\hat{S}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an $i^{th}$ transmitting antenna and $j^{th}$ information. The W is called the weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{[Formula 5]}$$

$$= W\hat{s} = WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \quad \text{[Formula 6]}$$

And, let's define each of the information different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting information different from each other. Hence, the channel matrix H can be represented as Formula 7 in the following.

$$\text{\# of streams} \leq \text{rank}(H) \leq \min(N_T, N_R) \quad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Of course, a hybrid form of the space diversity and the space multiplexing is also available.

In the following description, channel state information (CSI) report is explained. In a current LTE standard, there exist two types of transmission scheme, i.e., an open-loop MIMO operated without channel information and a closed-loop MIMO operated based on channel information. In particular, in the closed loop MIMO, each of a user equipment and a base station can perform a beamforming based on the channel state information to obtain a multiplexing gain of MIMO antenna. In order to obtain channel state information from the user equipment, the base station commands the user equipment to feedback the channel state information (CSI) on a DL signal in a manner of assigning physical uplink control channel (PUCCH) or physical uplink shared channel (PUSCH) to the user equipment.

The CSI is mainly classified into an RI (rank indicator), a PMI (precoding matrix index), and a CQI (channel quality indication). First of all, as mentioned in the foregoing description, the RI indicates rank information of a channel and means the number of streams capable of being received by a user equipment via an identical frequency-time resource. And, since the RI is determined by a long term fading of a channel, the RI is feedback to a base station with a longer interval compared to the PMI and CQI value in general.

Secondly, the PMI is a value reflecting a spatial characteristic of a channel and indicates a UE's preferred precoding matrix index of a base station on the basis of such a metric as SINR and the like. Lastly, the CQI is a value indicating strength of a channel and means a reception SINR capable of being received in case that a base station uses the PMI in general.

A communication system supporting more enhanced standard such as LTE-A standard considers obtaining additional multi-user diversity by using a multi user-MIMO (MU-MIMO) scheme. Since interference exists between user equipments, which are multiplexed in an antenna domain, in the MU-MIMO scheme, whether or not CSI is accurate may considerably affect not only a user equipment, which has reported the CSI, but also a different multiplexed user equipment. Hence, more accurate CSI report is required in MU-MIMO compared to SU-MIMO.

Hence, LTE-A standard has determined to design a final PMI to be divided into a W1 corresponding to a long term and/or wideband (WB) PMI and W2 corresponding to a short term and/or a sub-band (SB) PMI.

As an example of a hierarchical codebook transformation scheme configuring a final PMI from the W1 and the W2 information, it may be able to use a long-term covariance matrix of a channel shown in Formula 8 in the following.

$$W = \text{norm}(W1\,W2) \quad \text{[Formula 8]}$$

In Formula 8, the W2 is a short-term PMI and corresponds to a codeword of a codebook designed to reflect short-term channel state information. W is a codeword (in other word, a precoding matrix) of a final codebook and norm (A) means a matrix that a norm of each column of a matrix A is normalized to 1.

A concreate structure of a legacy W1 and W2 is shown in Formula 9 in the following.

$$W1(i) = \begin{bmatrix} X_i & 0 \\ 0 & X_i \end{bmatrix}, \text{ where } X_i \text{ is } Nt/2 \text{ by } M \text{ matrix} \quad \text{[Equation 9]}$$

$$W2(j) = \overbrace{\begin{bmatrix} e_M^k & e_M^l & e_M^m \\ \alpha_j e_M^k & \beta_j e_M^l & \cdots & \gamma_j e_M^m \end{bmatrix}}^{r \text{ columns}}$$

(if rank = r), where $1 \le k, l, m \le M$ and $k, l, m$ are integer.

In this case, $N_t$ indicates the number of transmitting antennas and M corresponds to the number of columns of a matrix $X_i$. Hence, the M indicates that there exist total M number of column vectors in the matrix $X_i$. $e_M^k$, $e_M^l$, and $e_M^m$ indicate a $k^{th}$, an $l^{th}$ and a $m^{th}$ column vector in the matrix X, as column vectors where a $k^{th}$, an $l^{th}$ and a $m^{th}$ element are 1 and remaining elements are 0 among the M number of elements. $\alpha_j$, $\beta_j$ and $\gamma_j$ correspond to complex values including a unit norm and respectively indicate that a phase rotation is applied to the column vector when each of the $k^{th}$, the $l^{th}$ and the $m^{th}$ column vector of the matrix X, is sort out. i corresponds to an integer equal to or greater than 0 and indicates a PMI index indicating the W1. j corresponds to an integer equal to or greater than 0 and indicates a PMI index indicating the W2.

The codebook structure shown in Formula 9 is a structure designed to reflect a correlation property of a channel, which occurs in case that a cross polarized antenna is used and a space between antennas is dense (commonly, in case that a distance between neighboring antennas is less than a half of a signal wavelength). In case of using the cross polarized antenna, antennas can be classified into a horizontal antenna group and a vertical antenna group. Each antenna group has a characteristic of an ULA (uniform linear array) antenna and the two antenna groups are co-located.

Hence, correlation between antennas within an antenna group has a property of linear phase increment. And, correlation between antenna groups has a property of phase rotation. Consequently, since a codebook corresponds to a quantized channel value, it is necessary to design the codebook in a manner of reflecting the characteristic of a practical channel as it is. For clarity, a rank 1 codeword, which is formed by the aforementioned structure, can be represented as Formula 10 in the following.

$$W1(i) * W2(j) = \begin{bmatrix} X_i(k) \\ \alpha_j X_k(k) \end{bmatrix} \quad \text{[Formula 10]}$$

In Formula 10, a codeword is represented by a vector of $N_t$ (number of transmitting antennas)×1 and is structured by two vectors corresponding to a upper vector $X_i(k)$ and a lower vector $\alpha_j X_i(k)$. The upper vector $X_i(k)$ indicates the correlation characteristic of a horizontal antenna group and the lower vector $\alpha_j X_i(k)$ indicates the correlation characteristic of a vertical antenna group. And, the $X_i(k)$ can be represented by a vector having linear phase increment by reflecting the correlation characteristic between antennas belonging to each of the groups. As a representative example, it may be able to use a DFT matrix.

As mentioned in the foregoing description, channel state information (CSI) includes CQI, PMI, RI etc. in LTE system, by which the present invention may be non-limited. All of the CQI, the PMI and the RI can be transmitted or a part of the CQI, the PMI and the RI can be transmitted according to a transmission mode of each user equipment. A case of periodically transmitting channel state information is called periodic reporting and a case of transmitting channel state information by a request of a base station is called aperiodic reporting. In case of the aperiodic reporting, a request bit included in UL scheduling information, which is transmitted by a base station, is transmitted to a user equipment. Subsequently, the user equipment delivers channel state information to the base station via PUSCH (physical uplink shared channel) in consideration of a transmission mode of the user equipment. In case of the periodic reporting, a period, an offset in the period and the like are semi-statically signaled in a subframe unit via an upper layer signal according to each UE. A UE delivers channel state information to the base station via PUCCH (physical uplink control channel) according to a determined period in consideration of a transmission mode. If UL data simultaneously exists in a subframe in which the channel state information is transmitted, the channel state information is transmitted on PUSCH (physical uplink shared channel) together with the data. The base station transmits transmission timing information appropriate for a UE to the UE in consideration of a channel status of each UE, UE distribution status in a cell and the like. The transmission timing information can be transmitted to each UE via an RRC message in a manner of including a period, offset, and the like for transmitting the channel state information.

FIGS. 8 to 11 are diagrams for an example of periodic reporting of channel state information.

Figures 8, 9:
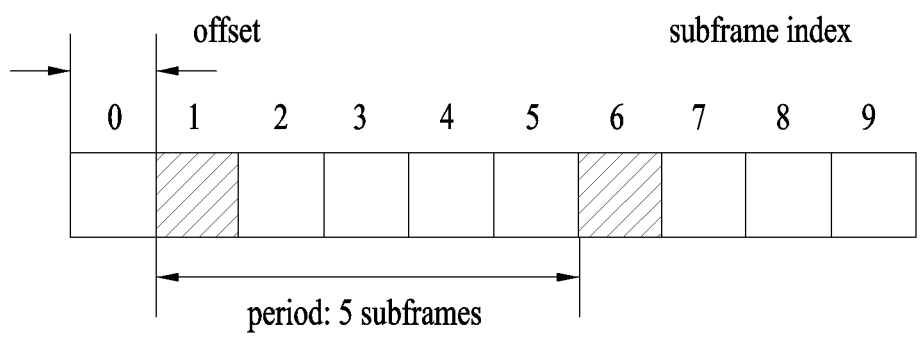
FIGS. 8 to 11 are diagrams for an example of periodic reporting of channel state information.

Referring to FIG. 8, there exist 4 CQI reporting modes in LTE system. Specifically, a CQI reporting mode is divided into a WB CQI and an SB CQI according to a CQI feedback type and is divided into no PMI and a single PMI according to whether PMI is transmitted. In order to periodically report CQI, each UE receives information consisted of a combination between a period and an offset via RRC signaling.

FIG. 9 shows an example of transmitting channel state information when information indicating {period '5' and offset '1'} is signaled to a user equipment. Referring to FIG. 9, if information indicating a period of '5' and an offset of '1' is received, a user equipment puts an offset of a subframe from a $0^{th}$ subframe in an increasing direction of a subframe index and transmits channel state information in a unit of 5 subframes. Basically, although the channel state information is transmitted on PUCCH, if PUSCH for transmitting data exists at the same time, the channel state information is transmitted on PUSCH together with the data. The subframe index is configured by a combination between a system frame number (a radio frame index) ($n_f$) and a slot index ($n_s$, 0 to 19). Since a subframe includes 2 slots, the subframe index can be defined by '$10*n_f+\text{floor}(n_s/2)$'. The floor ( ) corresponds to a floor function.

There exist a type of transmitting a WB CQI only and a type of transmitting both the WB CQI and a SB CQI. According to the type transmitting the WB CQI only, CQI information on a whole band is transmitted in a subframe corresponding to every CQI transmission interval. Meanwhile, as shown in FIG. 8, in case of transmitting PMI as well as well as the CQI information according to a PMI feedback type, PMI information is transmitted together with the CQI information. According to the type of transmitting both the WB CQI and the SB CQI, the WB CQI and the SB CQI are alternately transmitted.

Figure 10:
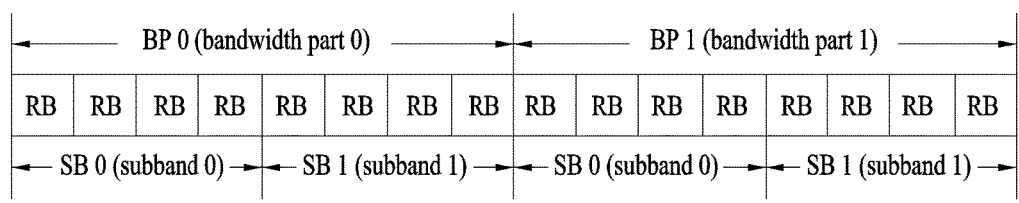

FIG. 10 shows an example of a system that a system band is configured by 16 RBs. In this case, assume that the system band includes two BPs (bandwidth parts) (BP0 and BP1), each BP includes two SBs (subbands) (SB0 and SB1), and each SB includes 4 RBs. The aforementioned assumption is just an example for explaining the present invention. The number of BPs and a size of each SB may vary according to a size of a system band. And, the number of SBs configuring each BP may vary according to the number of RBs, the number of BPs and a size of an SB.

In case of the type of transmitting both the WB CQI and the SB CQI, the WB CQI is transmitted in a first CQI transmission subframe and a CQI for a SB of a good channel state among a SB0 and a SB1 belonging to a BP0 and an index (e.g., sub-band selection indicator (SSI)) of the SB are transmitted in a next CQI transmission subframe. Subsequently, a CQI for a SB of a good channel state among a SB0 and a SB1 belonging to a BP1 and an index of the SB are transmitted in a next CQI transmission subframe. As mentioned above, CQI information on each BP is sequentially transmitted after the WB CQI is transmitted. The CQI information on each BP can be sequentially transmitted from 1 to 4 times between two WB CQIs. For instance, if the CQI information on each BP is sequentially transmitted one time between two WB CQIs, it may be able to transmit the information in an order of WB CQI=>BP0 CQI=>BP1 CQI=>WB CQI. If the CQI information on each BP is sequentially transmitted 4 times between two WB CQIs, it may be able to transmit the information in an order of WB CQI=>BP0 CQI=>BP1 CQI=>BP0 CQI=>BP1 CQI=>BP0 CQI=>BP1 CQI=>BP0 CQI=>BP1 CQI=>WB CQI. Information on the number of sequential transmission of each BP CQI is signaled by an upper layer (e.g., RRC layer).

Figure 11:
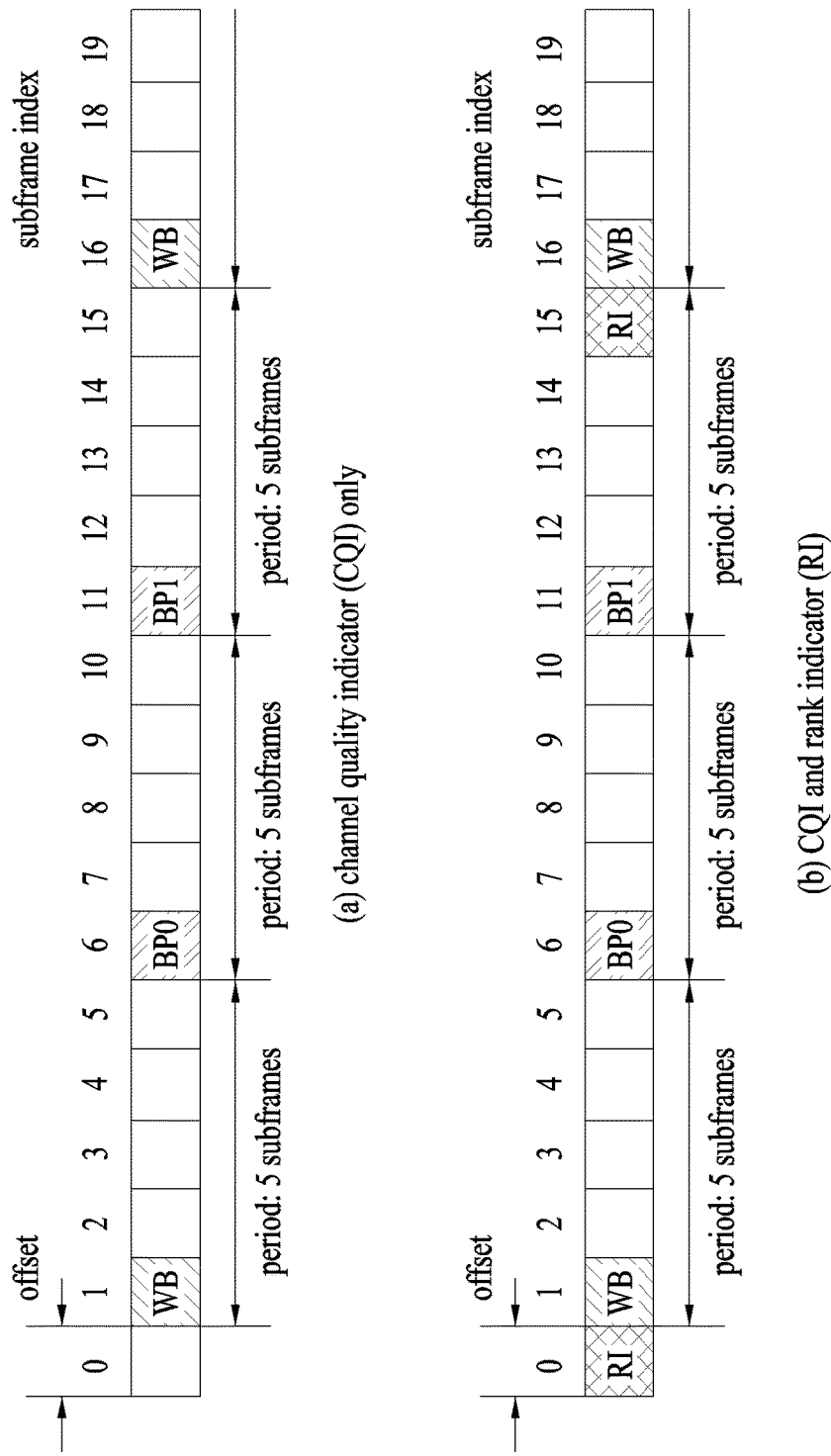

FIG. 11 (a) shows an example of transmitting both a WB CQI and a SB CQI when information indicating {period '5' and offset '1'} is signaled to a user equipment. Referring to FIG. 11 (a), a CQI can be transmitted in a subframe corresponding to the signaled period and an offset only irrespective of a type. FIG. 11 (b) shows a case of additionally transmitting an RI in the case of FIG. 11 (a). The RI indicates a multiple of a transmission period of the WB CQI and can be signaled by an upper layer (e.g., RRC layer) by a combination of an offset in the transmission period. The offset of the RI is signaled by a relative value for an offset of the CQI. For instance, if the offset of the CQI corresponds to '1' and the offset of the RI corresponds to '0', the RI and the CQI may have an identical offset. The offset of the RI is defined by a negative value. Specifically, FIG. 11 (b) assume that a transmission period of the RI is one time of a transmission period of the WB CQI and the offset of the RI corresponds to '−1' in environment identical to environment of FIG. 11 (a). Since the transmission period of the RI is one time of the transmission period of the WB CQI, a transmission period of channel state information is practically identical to each other between the RI and the WB CQI. Since the offset of the RI corresponds to '−1', the RI is transmitted on the basis of '−1' for the offset '1' of the CQI shown in FIG. 11 (a) (i.e., $0^{th}$ subframe). If the offset of the RI corresponds to '0', a subframe in which the WB CQI is transmitted and a subframe in which the RI is transmitted are overlapped with each other. In this case, the WB CQI is dropped and the RI is transmitted.

Figure 12:
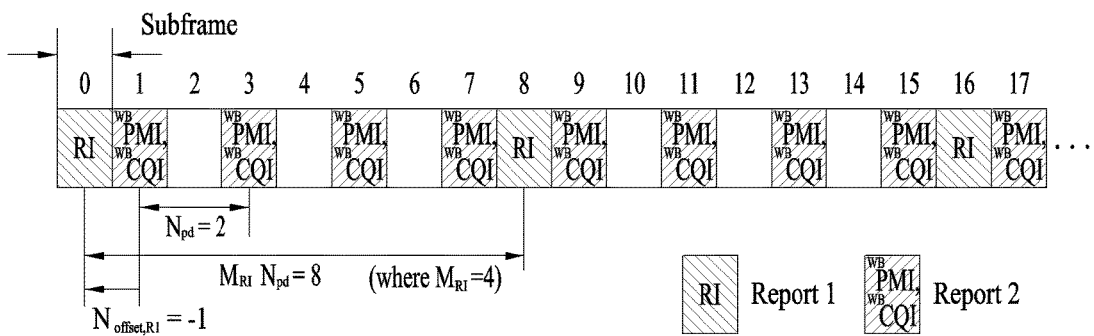
FIGS. 12 and 13 are diagrams for an example of a process of periodically reporting channel state information in case of using a non-hierarchical codebook.

FIG. 12 shows an example of CSI feedback in case of a mode 1-1 mentioned earlier in FIG. 8.

Referring to FIG. 12, CSI feedback consists of transmission of report contents of two types including a report 1 and a report 2. Specifically, an RI is transmitted via the report 1 and a WB PMI and a WB CQI are transmitted via the report 2. The report 2 is transmitted in a subframe index satisfying '$(10*n_f+\text{floor}(n_s/2)-N_{offset,CQI})\bmod(N_{pd})=0$'. The $N_{offset,CQI}$ corresponds to an offset value configured to transmit the PMI/CQI mentioned earlier in FIG. 9 and FIG. 12 shows an example of a case that the $N_{offset,CQI}$ corresponds to 1. The $N_{pd}$ indicates a subframe interval between adjacent reports 2. FIG. 12 shows an example of a case that the $N_{pd}$ corresponds to 2. The report 1 is transmitted in a subframe index satisfying '$(10*n_f+\text{floor}(n_s/2)-N_{offset,CQI}-N_{offset,RI})\bmod(M_{RI}*N_{pd})=0$'. The $M_{RI}$ is determined by upper layer signaling. The $N_{offset,RI}$ corresponds to a relative offset value configured to transmit the RI mentioned earlier in FIG. 11. FIG. 12 shows an example that the $M_{RI}$ corresponds to 4 and the $N_{offset,RI}$ corresponds to −1.

Figure 13:
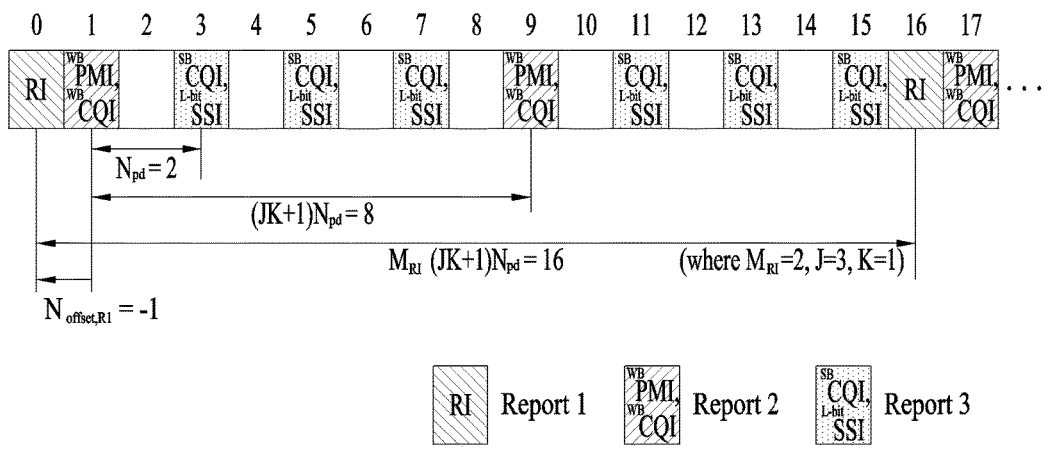

FIG. 13 shows an example of CSI feedback in case of a mode 2-1 of FIG. 8.

Referring to FIG. 13, CSI feedback consists of transmission of report contents of three types including a report 1, a report 2 and a report 3. Specifically, an RI is transmitted via the report 1, a WB PMI and a WB CQI are transmitted via the report 2 and a SB (subband) CQI and L-bit subband selection indicator (SSI) are transmitted via the report 3. The report 2 or the report 3 is transmitted in a subframe index satisfying '$(10*n_f+\text{floor}(n_s/2)-N_{offset,CQI})\bmod(N_{pd})=0$'. In particular, the report 2 is transmitted in a subframe index satisfying '$(10*n_f+\text{floor}(n_s/2)-N_{offset,CQI})\bmod(H*N_{pd})=0$'. Hence, the report 2 is transmitted in every interval of $H*N_{pd}$ and subframes between adjacent reports 2 are filled with transmission of the report 3. In this case, a value of H corresponds to J*K+1. In this case, the J corresponds to the number of BPs (bandwidth parts). The K corresponds to a value indicating the number of contiguously performing a full cycle, which performs a process of selecting a subband according to a BP different from each other and transmitting the selected subband. The K is determined by upper layer signaling. FIG. 13 shows an example that the $N_{pd}$ corresponds to 2, the J corresponds to 3 and the K corresponds to 1. In this case, the report 1 is transmitted in a subframe index satisfying '$(10*n_f+\text{floor}(n_s/2)-N_{offset,CQI}-N_{offset,RI})\bmod$ $(M_{RI}*(J*K+1)*N_{pd})=0$'. FIG. 13 shows an example of a case that the $M_{RI}$ corresponds to 2 and the $N_{offset,RI}$ corresponds to −1.

FIG. 14 shows an example of periodic reporting of channel state information, which is under discussion in LTE-A system. When a base station includes 8 transmission antennas, in case of a mode 2-1, as shown in the drawing, it is considering a periodic reporting mode subdivided into two forms according to a PTI value in a manner of configuring a PTI (pre-coder type indication) parameter corresponding to a 1-bit indicator. In the drawing, W1 and W2 indicate a hierarchical codebook mentioned earlier with reference to Formula 8 to 9. A precoding matrix W of a completed form is determined only when both the W1 and the W2 are determined and combined with each other.

Referring to FIG. 14, in case of periodic reporting, reporting of contents different from each other corresponding to a report 1, a report 2 and a report 3 is reported according to a repetition period different from each other. The report 1 reports an RI and 1-bit PTI value. The report 2 reports a WB (wideband) W1 (when PTI=0) or a WB W2 and a WB CQI (when PTI=1). The report 3 reports a WB W2 and a WB CQI (when PTI=0) or a SB (sub-band) W2 and a SB CQI (when PTI=1).

The report 2 and the report 3 are transmitted in a subframe (for clarity, a first subframe set) where a subframe index satisfies '$(10*n_f+\text{floor}(n_s/2)-N_{offset,CQI}) \mod(N_C)=0$'. The $N_{offset,CQI}$ corresponds to an offset value configured to transmit the PMI/CQI mentioned earlier in FIG. 9. The $N_C$ indicates a subframe interval between adjacent reports 2 or reports 3. FIG. 14 shows an example of a case that the $N_{offset,CQI}$ corresponds to 1 and the $N_C$ corresponds to 2. The first subframe set consists of subframes including an index of an odd number. The $n_f$ indicates a system frame number (a radio frame index) and the $n_s$ indicates a slot index in a radio frame. The floor ( ) corresponds to a floor function and 'A mod B' indicates a remainder resulted from dividing A by B.

The report 2 is positioned at a partial subframe of a first subframe set and the report 3 is positioned at the rest of subframes. Specifically, the report 2 is positioned at a subframe satisfying '$(10*n_f+\text{floor}(n_s/2)-N_{offset,CQI}) \mod (H*=N_c)=0$'. Hence, the report 2 is transmitted in every interval of $H*N_c$ and one or more first subframes positioned between adjacent reports 2 are filled with transmission of the report 3. If a PTI corresponds to 0, the H is identical to M and the M is determined by upper layer signaling. FIG. 14 shows an example of a case that the M corresponds to 2. If the PTI corresponds to 1, the H corresponds to 'J*K+1', the K is determined by upper layer signaling and the J corresponds to the number of BP (bandwidth part). FIG. 14 shows an example of a case that the J corresponds to 3 and the K corresponds to 1.

The report 1 is transmitted in a subframe satisfying '$(10*n_f+\text{floor}(n_s/2)-N_{offset,CQI}-N_{offset,RI}) \mod(M_{RI}*(J*K+1)*N_c)=0$' and the $M_{RI}$ is determined by upper layer signaling. The $N_{offset,RI}$ indicates a relative offset value for an RI and FIG. 14 shows an example of a case that the $M_{RI}$ corresponds to 2 and the $N_{offset,RI}$ corresponds to −1. Transmission timing of the report 1 and transmission timing of the report 2 are not overlapped with each other with the help of the $N_{offset,RI}$ corresponding to −1. When a user equipment calculates the RI, the W1 and the W2, the RI, the W1 and the W2 are calculated in a manner of being associated with each other. For instance, the W1 and the W2 are calculated depending on the RI value and the W2 is calculated depending on the W1. When all of the report 1, the report 2 and the report 3 are reported, a base station becomes aware of a final W from the W1 and the W2.

In the following, a method of efficiently feeding back channel information, which is fed back by a receiving end (e.g., user equipment) in downlink communication, using multiple antennas in consideration of a plurality of users proposed by the present invention is explained.

As mentioned in the foregoing description, a wireless communication system is configured to feed back an RI, a PMI, and a CQI for a channel to a transmitting end (e.g., a base station) by a receiving end in consideration of multiple antennas. In particular, the RI indicates the maximum number of layers capable of being received by the receiving end using an identical frequency-time resource on a specific channel, i.e., the maximum number of layers capable of transmitting information different from each other by the transmitting end. The PMI is a value to which a spatial characteristic of a channel is reflected and indicates a precoding matrix index of the transmitting end preferred by the receiving end on the basis of such a metric as SINR and the like. The CQI corresponds to a value indicating strength of a channel and indicates quality information of a channel when a selected PMI and RI information are applied. These channel information are used for the transmitting end to select a receiving end configured to transmit a signal or apply the appropriate number of transmission layers and precoding to the selected receiving end in the middle of establishing a connection between the transmitting end and the receiving end.

An importance of the channel information is increasing as a system considering multi-user is constructed. In the system considering multi-user, a base station selects multiple users based on channel information (i.e., RI/CQI/PMI) fed back from each of receiving ends and transmits a signal to the selected users at the same time. In this case, since interference between receiving ends affects system performance, when the base station transmits the signal, the base station performs precoding to control the interference.

Hence, if each of the receiving ends feeds back incorrect channel information, the base station is unable to perform the precoding, which is capable of efficiently control the interference occurring between the receiving ends, and this may cause huge performance degradation of the receiving ends. For this reason, correct channel information is more important in the system considering multiple users compared to a system considering a single user.

In relation to the aforementioned channel information feedback, a CSI feedback scheme in LTE standard (3GPP LTE release-10) can be classified into periodic reporting transmitted via PUCCH (physical uplink control channel) and aperiodic reporting transmitted via PUSCH (physical uplink shared channel) upon a request of a base station. In case of the aperiodic reporting, the aperiodic reporting is set to each receiving end by a request bit included in uplink scheduling information, which is transmitted to a receiving end by the base station. If each receiving end receives a request from the base station, each receiving end reports channel information in consideration of a transmission mode of each receiving end (e.g., a user equipment) to the base station via PUSCH.

The aperiodic reporting of channel information is explained in more detail. A reporting mode according to a CQI/PMI feedback type is shown in Table 1 in the following.

TABLE 1

| | | PMI Feedback Type | |
|---|---|---|---|
| | | No PMI (OL, TD; single-antenna) | With PMI (CL) |
| PUSCH CQI feedback type | Wideband (wideband CQI) | | Mode 1-2: Multiple PMI<br>RI<br>$1^{st}$ wideband CQI(4 bit)<br>$2^{nd}$ wideband CQI(4 bit) if RI > 1<br>N*Subband PMI(4 bit)<br>(N is the total # of subbands)<br>(if 8Tx Ant, N*subband W2 + wideband W1) |
| | UE Selected (subband CQI) | Mode 2-0<br>RI (only for Open-loop SM)<br>$1^{st}$ wideband CQI(4 bit) + Best-M CQI(2 bit)<br>(Best-M CQI: average CQI for M number of SBs selected from total N number of SBs)<br>Best-M index (L bit) | Mode 2-2: Multiple PMI<br>RI<br>$1^{st}$ wideband CQI(4 bit) + Best-M CQI(2 bit)<br>$2^{nd}$ wideband CQI(4 bit) + Best-M CQI(2 bit)<br>if RI > 1<br>Best-M index (L bit)<br>Wideband PMI(4 bit) + Best-M PMI(4 bit)<br>(if 8Tx Ant, wideband W2 + Best-M W2 + wideband W1) |
| | Higher layer-configured (subband CQI) | Mode 3-0<br>RI (only for Open-loop SM)<br>$1^{st}$ widebandSQI(4 bit) +<br>N*subbandCQI(2 bit) | Mode 3-1: Single PMI<br>RI<br>$1^{st}$ wideband CQI(4 bit) +<br>N*subbandCQI(2 bit)<br>$2^{nd}$ wideband CQI(4 bit) +<br>N*subbandCQI(2 bit) if RI > 1<br>Wideband PMI(4 bit)<br>(if 8Tx Ant, wideband W2 + wideband W1) |

In Table 1, wideband (WB) CQI/PMI indicates CQI/PMI calculated on a frequency band in consideration of a whole system bandwidth and a sub band (SB) CQI/PMI indicates CQI/PMI calculated in each subband in a manner of dividing a wideband into a plurality of blocks, i.e., subbands.

Each row shown in Table 1 is divided according to a feedback type of CQI. In particular, a first row indicates CQI feedback in consideration of a wideband, a second row indicates CQI feedback selected in consideration of the wideband CQI and M number of subband selected from the wideband and a third row indicates CQI feedback in consideration of the wideband CQI and each subband CQI. Each column is divided according to whether PMI is fed back. A first column indicates that PMI is not fed back and a second column indicates that PMI is fed back. In particular, in case of modes (i.e., a mode 1-2, a mode 2-2 and a mode 3-1) that PMI is fed back, the PMI is calculated based on a wideband or a subband according to each mode and a calculated PMI is fed back.

A subband size of a legacy wireless communication system (i.e., 3GPP LTE release-10) is configured according to a system bandwidth as shown in Table 2 in the following for a feedback mode 1-2, 3-0 and 3-1. In the following, for clarity, wireless communication systems appeared before 3GPP LTE release-10 are defined as a legacy wireless communication system.

TABLE 2

| System Bandwidth $N_{RB}^{DL}$ | Subband Size (k) |
|---|---|
| 6-7 | NA |
| 8-10 | 4 |
| 11-26 | 4 |
| 27-63 | 6 |
| 64-110 | 8 |

For instance, referring to Table 2, in case of a system bandwidth consisting of 28 resource blocks (RBs), a subband includes 6 RBs and a wideband includes 5 subbands. In this case, a size of a $5^{th}$ subband includes 4 RBs due to a deficiency of a system bandwidth.

As a size of a subband is getting smaller, a PMI/CQI value is more accurately calculated, thereby enhancing performance of a system considering multiple users. Hence, CQI/PMI considering a subband is more preferable than a wideband in terms of system performance enhancement.

Yet, referring to Table 1 related to a reporting mode on a legacy wireless system (3GPP LTE release-10), a feedback mode supporting a subband CQI and a subband PMI at the same time is not supported.

For instance, referring to a mode 1-2 related to a wideband feedback, although a user equipment is able to feed back the wideband CQI and the subband CQI, the user equipment does not support the subband CQI and the subband PMI at the same time. Similarly, although a mode 3-1 supports the subband CQI and the wideband PMI, the mode 3-1 does not support the subband CQI and the subband PMI at the same time. Hence, a mode of supporting the subband CQI and the subband PMI at the same time is not supported in the legacy wireless communication system (3GPP LTE release-10).

Although the mode supporting the subband CQI and the subband PMI at the same time may bring good performance, since CQI and PMI are fed back in a manner of calculating the CQI and the PMI according to all subbands, it is necessary to consider overhead.

Hence, the present invention proposes a method of efficiently supporting a mode of reducing overhead and a mode of supporting the subband CQI and the subband PMI at the same time. In particular, in case of applying a subband feedback to CQI and PMI at the same time, the present invention proposes a method of preventing a feedback overhead from excessively increasing and a method capable of controlling overhead in a manner that a CQI and a PMI set a subband size different from each other.

1. Method of configuring subband size of aperiodic feedback mode supporting subband CQI and subband PMI at the same time <Embodiment 1>

A case of respectively fixing a subband size of CQI and a subband size of PMI according to a system bandwidth is explained in embodiment 1 of the present invention. In particular, according to the present invention, as shown in Table 3 in the following, a subband size can be configured by two sizes different from each other.

TABLE 3

| System Bandwidth $N_{RB}^{DL}$ | Subband Size of CQI (k1) | Subband Size of PMI (k2) |
|---|---|---|
| 6-7 | NA | NA |
| 8-10 | 4 | 6 |
| 11-26 | 4 | 6 |
| 27-63 | 6 | 9 |
| 64-110 | 8 | 12 |

Table 3 shows a case that a subband size of CQI is configured to be identical to a subband size of a legacy wireless communication system (i.e., a wireless communication system appeared before 3GPP LTE release-10) and a subband size of PMI is increased as much as 1.5 times of the subband size of the CQI. If a mode including the subband CQI and the subband PMI, which are configured like Table 3, is formed, overhead of the PMI can be reduced as much as about 34% compared to a case of applying a same subband size to the CQI and the PMI. In the foregoing description, although a subband size is configured on the basis of the legacy wireless communication system, according to the embodiment 1 of the present invention, when the subband size of the CQI is configured according to a system bandwidth, if the subband size of the PMI is (fixedly) configured by a prescribed multiple of the subband size of the CQI, it may be able to identically apply the subband size of the PMI, although a subband size different from each other is applied.

Yet, in case of following the embodiment 1 of the present invention, it is necessary to consider one thing. It may have a case that two PMIs are applied to a single subband in which CQI is to be calculated. Yet, in case of calculating CQI/PMI in terms of a receiving end, complexity may not be further increased compared to a legacy system. In particular, the receiving end calculates PMI for a subband of the PMI, applies the PMI to an each RB within a subband of the CQI, and may be able to calculate the CQI.

According to the embodiment 1 of the present invention, as shown in Table 4 in the following, a subband size of the PMI can be configured by a subband size twice as large as a subband size of a legacy wireless communication system (a wireless communication system appeared before 3GPP LTE release-10).

TABLE 4

| System Bandwidth $N_{RB}^{DL}$ | Subband Size of CQI (k1) | Subband Size of PMI (k2) |
|---|---|---|
| 6-7 | NA | NA |
| 8-10 | 4 | 8 |
| 11-26 | 4 | 8 |
| 27-63 | 6 | 12 |
| 64-110 | 8 | 16 |

Or, the subband size of the PMI can be independently configured according to a system bandwidth. In particular, as shown in Table 5 in the following, the subband size of the PMI is configured by a size (i.e., 6 RBs), which is bigger than a subband supported by a legacy wireless communication system (3GPP LTE release-10) as much as 1.5 times, only when a system bandwidth corresponds to 6-7 and the subband size of the PMI can be configured by a value twice as large as the subband supported by a legacy wireless communication system (3GPP LTE release-10) on the remaining system bandwidth (i.e., $8 \leq N_{RB}^{DL} \leq 110$).

TABLE 5

| System Bandwidth $N_{RB}^{DL}$ | Subband Size of CQI (k1) | Subband Size of PMI (k2) |
|---|---|---|
| 6-7 | NA | NA |
| 8-10 | 4 | 6 |
| 11-26 | 4 | 8 |
| 27-63 | 6 | 12 |
| 64-110 | 8 | 16 |

Or, either the subband of the CQI or the subband of the PMI can be configured to be smaller than the subband supported by the legacy wireless communication system (3GPP LTE release-10). For instance, as shown in Table 6 in the following, assume that a size of the subband of the CQI is configured by a half size of the subband supported by the legacy wireless communication system (3GPP LTE release-10). For clarity, although it is assumed that the subband size of the PMI shown in Table 6 is configured by a size twice as big as the subband size supported by the legacy wireless communication system (3GPP LTE release-10), it is apparent that the subband size of the PMI can also be identical or smaller than the subband size supported by the legacy wireless communication system (3GPP LTE release-10). Moreover, a parameter related to the subband of the CQI and the subband of the PMI can be configured in advance between a transmitting end and a receiving end.

TABLE 6

| System Bandwidth $N_{RB}^{DL}$ | Subband Size of CQI (k1) | Subband Size of PMI (k2) |
|---|---|---|
| 6-7 | NA | NA |
| 8-10 | 2 | 8 |
| 11-26 | 2 | 8 |
| 27-63 | 3 | 12 |
| 64-110 | 4 | 16 |

<Embodiment 2>

Embodiment 2 of the present invention corresponds to a method of configuring an appropriate subband size of CQI and PMI based on determination of a base station. In the embodiment 2 of the present invention, assume that a default value of a subband size (hereinafter, $S_{RB}$) is determined as Table 2. For instance, if a system bandwidth is configured by 28 RB(s), it may be able to represent as $S_{28}=6$ according to Table 2.

If it is assumed that a subband size of CQI is defined as $C_{RB}$ and a subband size of PMI is defined as $P_{RB}$, the subband size of the CQI and the subband size of the PMI can be determined as $C_{RB}=\Delta_C \times S_{RB}$ and $P_{RB}=\Delta_P \times S_{RB}$, respectively. Hence, the subband size of the CQI and the subband size of the PMI are determined according to the $\Delta_C$ and the $\Delta_P$. A set consisting of the $\Delta_C$ and the $\Delta_P$ (or parameters related to the $\Delta_C$ and the $\Delta_P$) can be configured in advance between a transmitting end and a receiving end.

Moreover, the transmitting end selects the $C_{RB}$ and the $P_{RB}$ and may be then able to inform the receiving end of the $C_{RB}$ and the $P_{RB}$ via upper layer signal (e.g., RRC signaling).

Or, the transmitting end selects a specific $\Delta_C$ and $\Delta_P$ from a set consisting of a plurality of $\Delta_C$ and $\Delta_P$ and may be then able to inform the receiving end of the specific $\Delta_C$ and $\Delta_P$ via RRC signaling and the like.

The embodiment 2 of the present invention can be applied to either CQI or PMI only. A fixed value can be applied to the remaining one (e.g., the embodiment 2 of the present invention is applied in a manner of being combined with the embodiment 1 of the present invention).

<Embodiment 3>

Embodiment 3 of the present invention corresponds to a method of controlling the number of subband of CQI/PMI to be fed back. If the number of subband permitted to CQI corresponds to $B_C$ and the number of subband permitted to PMI corresponds to $B_P$, a subband size can be configured as $$\left\lceil \frac{\text{system bandwidth}}{R_C} \right\rceil \text{ and } \left\lceil \frac{\text{system bandwidth}}{B_P} \right\rceil,$$

respectively (In this case, $\lceil \ \rceil$ indicates a ceiling calculation). In particular, a size of a subband can be configured based on a size of a system bandwidth and the number of subband of CQI/PMI. If a subband size is calculated according to the embodiment 3 of the present invention, a last subband size is determined by a remainder resulted from dividing a system bandwidth by the $B_C$ or the $B_P$.

For instance, when a system bandwidth corresponds to 30 RB(s) and $B_C$ corresponds to 4, the subband size of the CQI becomes $$\left\lceil \frac{\text{system bandwidth}}{B_C} \right\rceil = 8.$$

Hence, the subband size of the CQI includes 8 RB(s). Yet, since a whole system bandwidth is not sufficient enough, a last subband includes 6 RB(s) corresponding to a remainder. In this case, a set of values for the $B_C$ and the $B_P$ to be selected by the transmitting end can be configured in advance between the transmitting end and the receiving end.

The embodiment 3 of the present invention can be applied to either CQI or PMI only. A fixed value can be applied to the remaining one.

Moreover, in case of applying the aforementioned embodiments of the present invention, when a subband size of PMI and a subband size of CQI are configured, it may be able to apply embodiments different from each other to the CQI and the PMI, respectively (e.g., the subband size of the CQI is determined by the embodiment 2 and the subband size of the PMI may be determined by the embodiment 3).

FIGS. 15 and 16 are diagrams for explaining an aperiodic feedback mode of LTE-A and a feedback overhead for subband CQI/PMI proposed by the present invention. In FIGS. 15 and 16, RB(s) indicate a resource block and an AP indicates an antenna port. In particular, AP4 indicates 4 antenna ports and AP8 indicates 8 antenna ports. And, bit(s) corresponds to a feedback bit and indicates an amount of feedback overhead. Moreover, in FIGS. 15 and 16, in 'mode(x, y)' proposed by the present invention, x indicates a parameter $\Delta_C$ for determining a subband size of CQI and y indicates a parameter $\Delta_P$ for determining a subband size of PMI. In particular, the 'mode(x, y)' indicates a mode proposed by the present invention, which is configured in a manner that the subband size of the CQI is configured by an x multiple and the subband size of the PMI is configured by a y multiple on the basis of a subband size of a legacy wireless communication system. Moreover, FIG. 15 shows a case that a rank corresponds to 1 and FIG. 16 shows a case that a rank corresponds to 2.

A PUSCH report mode reporting the subband CQI/PMI proposed by the present invention is explained with reference to FIGS. 15 and 16 in the following.

In FIG. 15, if a rank corresponds to 1, it indicates that 'Mode 1-2' has more overhead compared to 'Mode 3-1' and 'Mode 2-2'. In case of using an aperiodical feedback mode proposed by the present invention without changing a subband size (i.e., 'Mode (1,1))', it is able to know that overhead is increased as much as maximum 40% compared to the 'Mode 1-2'. Yet, it may be able to perform the aperiodic feedback mode without additional overhead in a manner of applying the aperiodic feedback mode proposed by the aforementioned embodiments of the present invention (e.g., 'Mode (1, 2)' or 'Mode (1.5, 1.5))'.

In FIG. 16, if a rank corresponds to 2, it indicates that 'Mode 3-1' has more overhead compared to 'Mode 1-2' and 'Mode 2-2'. In this case, in case of performing the aperiodical feedback mode (i.e., a mode supporting a subband CQI and a subband PMI at the same time) proposed by the present invention without changing a subband size, it is able to know that overhead is increased as much as maximum 67% compared to the 'Mode 3-1'.

Yet, as mentioned earlier in the rank 1, the 'Mode (1, 2)' can also be applied to reduce the increased amount of feedback overhead in the rank 2. In particular, when a system bandwidth corresponds to 100 RB(s), if the 'Mode (1, 2)' is applied, the increased amount of feedback overhead is reduced to 33%, which is a half of 67% of the overhead resulted from supporting the subband CQI and the subband PMI at the same time without changing a subband size. In particular, for instance, in case of applying the aperiodical feedback mode supporting the subband CQI and the subband PMI at the same time without increasing feedback overhead, it may be able to use 'Mode (2, 2)' (refer to FIG. 16).

According to embodiments of the present invention, a subband size according to a system bandwidth can be differently configured. In particular, referring to FIGS. 15 and 16, it is able to know that feedback overhead of an aperiodic feedback mode increases together with the increase of a system bandwidth (i.e., 20->50->100 RB(s)). Hence, in case of a system including a small system bandwidth, the system may permit more feedback overhead. Hence, according to the embodiments of the present invention, a subband size of CQI/PMI can be configured to be gradually increased as a system bandwidth is increasing.

An example of changing a subband size of CQI/PMI according to a system bandwidth is explained with reference to Table 7 in the following.

TABLE 7

| System Bandwidth $N_{RB}^{DL}$ | Subband Size of CQI (k1) | Subband Size of PMI (k2) |
|---|---|---|
| 6-7 | NA | NA |
| 8-10 | 2 | 2 |
| 11-26 | 4 | 4 |
| 27-63 | 6 | 6 |
| 64-110 | 8 | 16 |

As shown in Table 7, if a system bandwidth is equal to or less than 63 RB(s), a subband size of CQI and a subband size of PMI are identically configured. Yet, if the system bandwidth is equal to or greater than 64 RB(s) and the system bandwidth is equal to or less than 110 RB(s) ($64 \leq N_{RB}^{DL} \leq 110$), the subband size of the PMI can be configured to be doubled of a subband size of a legacy wireless communication system.

And, according to the embodiments of the present invention, a subband size can be differently configured according to a rank. A difference of feedback overhead different from each other according to a rank is explained with reference to FIGS. 15 and 16 in the following. It is able to know that an amount of feedback overhead in rank 1 is smaller than an amount of feedback overhead in rank 2. Hence, a subband size can be differently configured according to a rank. For instance, if the rank corresponds to 1, it is able to use a periodic feedback mode supporting a subband CQI and a subband PMI at the same time. If the rank corresponds to 2, the periodic feedback mode supporting the subband CQI and the subband PMI at the same time is not supported. This is because, if multi user MIMO (MU-MIMO) is considered, a rank equal to or higher than the rank 2 has a lower selection frequency compared to the rank 1 and priority of the rank can be configured to be low in case of implementing a system.

Whether to apply the periodic feedback mode supporting the subband CQI and the subband PMI at the same time can be determined according to an amount of feedback overhead (e.g., feedback bit), which is permitted according to a rank and a system bandwidth. For instance, if a system bandwidth is used by maximum 110 RBs and a rank 2 is supported, a biggest amount of feedback overhead occurs in a legacy wireless communication system (a system appeared before 3GPP LTE release-10). In this case, the feedback overhead corresponds to 75 bits. The 75 bits indicate that an aperiodic CSI feedback is permitted up to 75 bits in the legacy wireless communication system.

Hence, according to the present invention, a subband size can be differently configured according to an amount of feedback overhead (e.g., feedback bit) which is permitted according to a rank and a system bandwidth. For instance, if the rank corresponds to 1, as shown in Table 8 in the following, a subband size can be configured in a manner that feedback overhead of a system including a highest value in a system bandwidth section to be close to 75 bits.

TABLE 8

| System Bandwidth $N_{RB}^{DL}$ | Subband Size of CQI (k1) | Subband Size of PMI (k2) |
| --- | --- | --- |
| 6-7 | NA | NA |
| 8-10 | 2 | 2 |
| 11-26 | 4 | 4 |
| 27-63 | 6 | 6 |
| 64-110 | 8 | 12 |

If a rank corresponds to 2, as shown in Table 9, a subband size can also be configured to be close to 75 bits.

TABLE 9

| System Bandwidth $N_{RB}^{DL}$ | Subband Size of CQI (k1) | Subband Size of PMI (k2) |
| --- | --- | --- |
| 6-7 | NA | NA |
| 8-10 | 2 | 2 |
| 11-26 | 4 | 4 |
| 27-63 | 9 | 9 |
| 64-110 | 16 | 16 |

In particular, it is able to check that the feedback overhead shown in Table 8 and Table 9 is close to about 75 bits with reference to the numbers shown in FIGS. 15 and 16. If feedback overhead amount (i.e., feedback bit(s)) is more permitted in a wireless communication system, a subband size can be (re)designed according to a rank and a system bandwidth in accordance with the more permitted feedback overhead amount. Or, a subband size can be configured in accordance with feedback overhead permitted to each system bandwidth instead of a system bandwidth section.

2. Method of configuring subband size based on CSI request field of aperiodic feedback mode supporting subband CQI and subband PMI at the same time In the aforementioned embodiments of the present invention, a method of controlling or adjusting a subband size for aperiodic CSI feedback has been explained. In the following, embodiments of using a CSI request field in a manner of combining the CSI request field with the embodiments of the present invention are additionally explained.

In a legacy wireless communication system, a CSI request field is configured by 1 or 2 bits. For instance, when the CSI request field is configured by 1 bit, if the CSI request field corresponds to '1', it indicates that a CSI report is triggered. CSI request fields configured by 2 bits are shown in Table 10 and Table 11 in the following.

TABLE 10

| Value of CSI request field | Description |
| --- | --- |
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

TABLE 11

| Value of CSI request field | Description |
| --- | --- |
| '00' | No aperiodic CSf report is triggered |
| '01' | Aperiodic CSI report is triggered for a set of CSI process(es) configured by higher layers for serving cell c |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

In particular, a CSI request field is applied to a user to which a transmission mode 1 to 9 is configured according to Table 10 and a CSI request field is applied to a user to which a transmission mode 10 is configured according to Table 11.

Hence, the present invention proposes a method of applying a subband size of CQI/PMI to a CSI request field in a combined form.

In particular, when a PUSCH report mode (i.e., aperiodic feedback mode), which reports a subband CQI and a subband PMI at the same time, proposed by the present invention is activated, it is able to configure Table 10 and Table 11 to indicate additional information.

For instance, in case of TM 1 to 9, if the PUSCH report mode is activated, although '00' is configured not to request a CSI report similar to a legacy wireless communication system, '01' is configured to perform an aperiodic CSI report for a serving cell and a fixed value according to the embodiment 1 of the present invention can be configured in relation to a subband size of a subband CQI/PMI. For instance, a subband size proposed in Table 2 to Table 9 or a subband size defined in advance according to a system bandwidth can be configured as a default value. Moreover, '10' and '11' are configured to perform an aperiodic CSI report for serving cells configured by a higher layer and a subband size can be configured using $C_{RB}$ and $P_{RB}$ (or $\Delta_C$ and $\Delta_P$) for a subband CQI/PMI via RRC signaling and the like. Or, a subband size can be configured using $$\left\lceil \frac{\text{system bandwidth}}{B_C} \right\rceil, \left\lceil \frac{\text{system bandwidth}}{B_P} \right\rceil$$

(or $B_C$, $B_P$).

Similarly, in case of a TM 10, if the PUSCH report mode is activated, although '00' is configured not to request a CSI report together with a legacy wireless communication system, '01' is configured to perform an aperiodic CSI report for a CSI process configured via higher layer for a serving cell and a fixed value according to the embodiment 1 of the present invention can be configured in relation to a subband size of a subband CQI/PMI. For instance, a subband size proposed in Table 2 to Table 9 or a subband size defined in advance according to a system bandwidth can be configured as a default value. Moreover, '10' and '11' are configured to perform an aperiodic CSI report for CSI processes configured by a higher layer and a subband size can be configured using $C_{RB}$ and $P_{RB}$ (or $\Delta_C$ and $\Delta_P$) for a subband CQI/PMI via RRC signaling and the like. Or, a subband size can be configured using $$\left\lceil \frac{\text{system bandwidth}}{B_C} \right\rceil, \left\lceil \frac{\text{system bandwidth}}{B_P} \right\rceil,$$

(or $B_C$, $B_P$).

In the aforementioned example, for clarity, it is assumed that a fixed value is used for '01' state in relation to a subband size (irrespective of a transmission mode). Yet, the present invention can be applied to not only a case of configuring a subband size with a fixed value in a specific state including the '01' state but also a case of configuring a subband size via upper layer signaling (e.g., RRC signaling). Moreover, as shown in Table 2 to Table 9, a single set consisting of at least one or more fixed values is configured and a specific value of the set can be designated via upper layer signaling (e.g., RRC signaling). The set can also be defined in advance between a transmitting end and a receiving end before a signal is transceived.

3. MU-MIMO-based aperiodic feedback mode supporting subband CQI and subband PMI at the same time Based on the aforementioned embodiments of the present invention, a method of feeding back feedback information (MU-CQI) considering multiple users is proposed for a system instantaneously selecting and using a system (SU-MIMO) considering a single user and a system considering multiple users (MU-MIMO).

As mentioned in the foregoing description, it is necessary for a MU-MIMO system to have accurate channel information to lower impact of interference between users transceiving a signal with each other at the same time. In particular, when channel information considering SU-MIMO is fed back only in a legacy wireless communication system, If the channel information is used, it may generate wrong scheduling, wrong precoding and wrong link adaptation in terms of MU-MIMO. Since PMI/CQI information calculated for SU-MIMO does not consider a PMI of a user to be simultaneously scheduled, if the information calculated for the SU-MIMO is used for MU-MIMO as it is, it is difficult to lower impact of interference. Hence, in order to solve the aforementioned problem, the present invention proposes a CQI for MU-MIMO.

The CQI for MU-MIMO can be calculated in various ways. For instance, a receiving end selects a PMI for the receiving end and may be then able to assume that a precoding vector orthogonal to the selected PMI corresponds to a PMI simultaneously used by a user to be scheduled. Hence, under this assumption, the receiving end can calculate a CQI using the PMIs (i.e., the selected PMI and the precoding vector orthogonal to the PMI). As mentioned in the foregoing description, various types of MU-CQIs are proposed to enhance MU-MIMO capability in a legacy wireless communication system (a system appeared before 3GPP LTE release-10).

Yet, there exists a problem in implementing a MU-CQI according to a related art. If a transmission mode is configured for MU-MIMO, it is able to configure a CQI calculated according to the aforementioned legacy scheme to be transmitted. Yet, in case of using SU-MIMO and MU-MIMO in a manner of instantaneously switching between the SU-MIMO and the MU-MIMO, it may occur a situation that a user reports a previously applied CQI for a single user (of a legacy wireless communication system). In particular, this is because a feedback structure of the related art considers feedback information of SU-MIMO only.

Hence, the present invention additionally proposes a method of feeding back a CQI for MU-MIMO.

A first method corresponds to a method of informing a user of whether a feedback considering SU-MIMO is requested or a feedback considering MU-MIMO is requested using a prescribed bit (e.g., 1 bit), when a CSI-RS or a CSI-process is configured. When an aperiodic CSI report is performed, the user can determine whether to feed back a SU-CQI or an MU-CQI using the aforementioned information.

A second method corresponds to a method of feeding back both the SU-CQI and the MU-CQI in a form of being combined with a PUSCH feedback mode. The second method is explained one by one based on the 'Mode 2-2' and the 'Mode 3-1' shown in Table 1 and the aperiodic feedback mode proposed by the embodiments of the present invention.

First of all, the second method is explained based on the 'Mode 2-2'. For instance, in the 'Mode 2-2', MU-CQI is fed back in a manner of additionally calculating the MU-CQI on the basis of the M number of selected subbands in a situation that dynamic switching between SU-MIMO and MU-MIMO is activated. In this case, i) the M number of subbands can be selected in a manner of considering SU-CQI only. In this case, the MU-CQI can be calculated under an assumption that the MU-CQI operates in the M number of subbands which are selected in consideration of the SU-CQI. ii) Or, the M number of subbands can be respectively calculated for each of the SU-CQI and the MU-CQI. In this case, it is preferable to perform additional feedback for the M number of selected subbands.

Moreover, it may be able to calculate a wideband CQI based on the 'Mode 2-2' in consideration of MU-MIMO. A first method of calculating the wideband CQI in consideration of the MU-MIMO is to calculate the wideband CQI in consideration of a SU-CQI only. In this case, a MU-CQI for the M number of subbands is calculated based on the wideband CQI, which is calculated in consideration of the SU-CQI. In other word, the wideband CQI is configured to be shared in both the SU-MIMO and the MU-MIMO.

A second method of calculating the wideband CQI in consideration of the MU-MIMO is to calculate a wideband CQI for a SU-CQI and a wideband CQI for a MU-CQI, respectively (i.e., two CQIs). In this case, additional overhead may occur in order to transmit the two wideband CQIs. Hence, for a wideband PMI and a best M PMI, basically, it is preferable for both a single user and multiple users to feed back an identical value. In this case, a receiving end selects the M number of subbands one time only in consideration of the SU-CQI, calculates a wideband CQI one time only in consideration of the SU-CQI, and additionally calculates the MU-CQI. Hence, in case of the second method, it may be able to additionally feedback 2 bits only when a rank corresponds to 1 or it may be able to additionally feedback 4 bits only when a rank corresponds to 2 or higher compared to the 'Mode 2-2' of Table 1.

Subsequently, the second method is explained based on the 'Mode 3-1'. A CQI for a subband can be fed back in a manner of alternately calculating a SU-CQI and a MU-CQI in a situation that dynamic switching is activated between SU-MIMO and MU-MIMO. For instance, if there exist 10 subbands, the SU-CQI is calculated in $1^{st}$, $3^{rd}$, $5^{th}$, $7^{th}$ and $9^{th}$ subband and the MU-CQI is calculated in a $2^{nd}$, $4^{th}$, $6^{th}$, $8^{th}$ and $10^{th}$ subband.

Similar to the aforementioned 'Mode 2-2', a wideband CQI can be calculated by two methods. A first method is to calculate the wideband CQI in consideration of a SU-CQI only. In this case, a MU-CQI is calculated based on the wideband CQI, which is calculated in consideration of the SU-CQI. In other word, the wideband CQI is configured to be shared in both the SU-MIMO and the MU-MIMO. A second method of calculating the wideband CQI is to calculate a wideband CQI for the SU-CQI and a wideband CQI for the MU-CQI, respectively (i.e., two CQIs). In this case, subbands in which the SU-CQI is to be calculated are collected to calculate a wideband SU-CQI and subbands in which the MU-CQI is to be calculated are collected to calculate a wideband MU-CQI. Moreover, for a wideband PMI, basically, it is preferable for both a single user and multiple users to feedback an identical value.

Hence, if the SU-CQI and the MU-CQI are alternately used in the 'Mode 3-1', it may be able to reduce overhead, which additionally occurs in case of performing feedback of the MU-CQI.

Lastly, the second method is explained based on the aperiodic feedback mode proposed by the present invention. In a situation that dynamic switching is activated between SU-MIMO and MU-MIMO, similar to the 'Mode 3-1', a SU-CQI and a MU-CQI can be configured to be alternately fed back in a mode transmitting a subband CQI and a subband PMI at the same time (a mode capable of permitting the subband CQI and the subband PMI at the same time similar to the present invention).

Similarly, a wideband CQI can be calculated by two methods. A first method is to calculate the wideband CQI in consideration of a SU-CQI only. In this case, a MU-CQI for a subband is calculated based on the wideband CQI, which is calculated in consideration of the SU-CQI. In other word, the wideband CQI is configured to be shared in both the SU-MIMO and the MU-MIMO. A second method of calculating the wideband CQI is to calculate a wideband CQI for the SU-CQI and a wideband CQI for the MU-CQI, respectively (i.e., two CQIs). In this case, subbands in which the SU-CQI is to be calculated are collected to calculate a wideband SU-CQI and subbands in which the MU-CQI is to be calculated are collected to calculate a wideband MU-CQI. Moreover, for a wideband PMI, basically, it is preferable for both a single user and multiple users to feedback an identical value.

A method of reporting channel state information according to a preferred embodiment of the present invention is explained with reference to FIG. 17.

Regarding downlink transmission transmitted from a transmitting end (e.g., base station) to a receiving end (e.g., user equipment), the receiving end measures a downlink channel state and may be able to feedback a result of the measurement to the base station in uplink. For instance, if 8 transmission antennas are used for the downlink transmission of the base station, the base station can transmit channel state information-reference signal (CSI-RS) via 8 antenna ports (antenna port index 15 to 22). The user equipment can transmit the measurement result (RI, PMI, CQI and the like) via the CSI-RS. The aforementioned various examples of the present invention can be applied to select/calculate the RI/PMI/CQI. The base station can determine the number of layers for downlink transmission, pre-coder, modulation and coding scheme (MCS) level and the like according to the received channel state information (RI/PMI/CQI) and may be able to transmit a downlink signal according to the channel state information.

Figure 17:
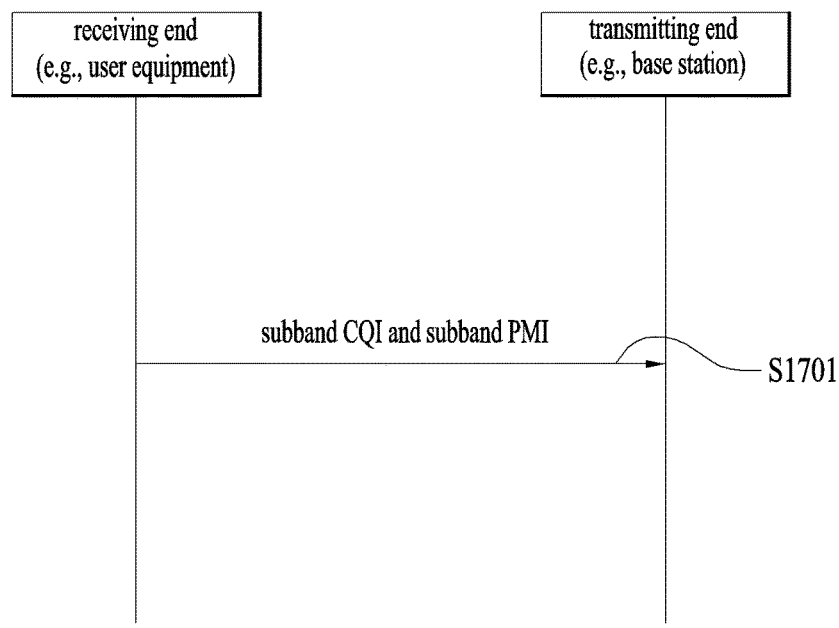
FIG. 17 is a diagram for a preferred embodiment according to the present invention.

In the step S1701 of FIG. 17, the receiving end can transmit a subband CQI and a subband PMI to the transmitting end. In the step S1701, as mentioned earlier in the embodiments of the present invention, a subband size applied to the subband CQI and a subband size applied to the subband PMI can be differently configured.

And, a subband size can be configured according to a CQI request field in accordance with a specific embodiment of the present invention. In some cases, the subband size can be determined by a combination of at least a part of the aforementioned embodiments of the present invention.

Moreover, the receiving end may be able to feedback the channel state information to the transmitting end in consideration of SU-MIMO/MU-MIMO.

The method of transmitting the channel state information according to the present invention, which is explained with reference to FIG. 17, can be performed in a manner of independently applying items explained in the aforementioned various embodiments of the present invention or applying two or more embodiments at the same time. For clarity, explanation on overlapped contents is omitted at this time.

Figure 18:
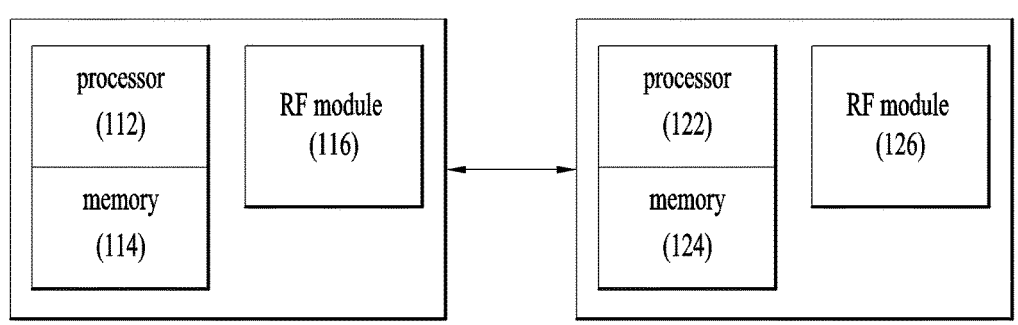
FIG. 18 is a diagram for a base station and a user equipment applicable to one embodiment of the present invention.

FIG. 18 is a diagram for a base station and a user equipment applicable to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 18, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of reporting channel state information in a wireless communication system supporting multiple antennas and an apparatus therefor are described centering on examples applied to 3GPP LTE system, it may be applicable to various kinds of wireless communication systems as well as to the 3GPP LTE system.

What is claimed is:

1. A method of performing feedback, by a user equipment, on channel status information (CSI) in a wireless communication system, the method comprising:
receiving, from a base station, a parameter for configuring a first subband size for measuring a subband channel quality indication (CQI) and for configuring a second subband size for measuring a subband precoding matrix index (PMI); and
performing feedback on the subband CQI and the subband PMI measured based on the first subband size and the second subband size, respectively,
wherein the first subband size is determined based on a system bandwidth, and
wherein the second subband size is determined based on feedback bits determined by the system bandwidth and a value of a rank indicator (RI).

2. The method of claim 1, wherein the feedback corresponds to an aperiodic feedback performed on a physical uplink shared channel (PUSCH).

3. The method of claim 1, wherein at least one of the first subband size and the second subband size is configured to correspond to a prescribed multiple of a predetermined subband size.

4. The method of claim 3, wherein the prescribed multiple is determined according to the system bandwidth.

5. The method of claim 1, wherein the second subband size is configured by a prescribed multiple of the first subband size.

6. The method of claim 1, wherein the first subband size is determined according to the number of subbands permitted for the subband CQI and wherein the second subband size is determined according to the number of subbands permitted for the subband PMI.

7. A user equipment performing feedback on channel status information (CSI) in a wireless communication system, comprising:
an RF (radio frequency) unit; and
a processor connected with the RF unit, the processor configured to:
receive, from a base station, a parameter for configuring a first subband size for measuring a subband channel quality indication (CQI) and for configuring a second subband size for measuring a subband precoding matrix index (PMI); and
perform feedback on the subband CQI and the subband PMI measured based on the first subband size and the second subband size, respectively,
wherein the first subband size is determined based on a system bandwidth, and
wherein the second subband size is determined based on feedback bits determined by the system bandwidth and a value of a rank indicator (RI).

* * * * *